US012610116B2

(12) United States Patent
Kommareddy et al.

(10) Patent No.: US 12,610,116 B2
(45) Date of Patent: Apr. 21, 2026

(54) INSPECTION SYSTEMS AND METHODS EMPLOYING DIRECTIONAL LIGHT FOR ENHANCED IMAGING

(71) Applicants: General Electric Company, Schenectady, NY (US); OLIVER CRISPIN ROBOTICS LIMITED, Altrincham (GB)

(72) Inventors: Vamshi Krishna Reddy Kommareddy, Bangalore (IN); Biswajit Medhi, Bangalore (IN); Sandeep Kumar, Bangalore (IN); Byron Andrew Pritchard, Loveland, OH (US); Andrew Crispin Graham, Badminton (GB); Peter John Nisbet, Bristol (GB)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 129 days.

(21) Appl. No.: 17/985,459

(22) Filed: Nov. 11, 2022

(65) Prior Publication Data

US 2024/0163537 A1     May 16, 2024

(51) Int. Cl.
H04N 23/53 (2023.01)
G01N 21/954 (2006.01)
(Continued)

(52) U.S. Cl.
CPC ........... H04N 23/53 (2023.01); G01N 21/954 (2013.01); H04N 23/56 (2023.01); H04N 23/555 (2023.01)

(58) Field of Classification Search
CPC ...... H04N 23/53; H04N 23/56; H04N 23/555; G01N 21/954
See application file for complete search history.

(56) References Cited

U.S. PATENT DOCUMENTS

| | | | |
|---|---|---|---|
| 3,778,170 A | 12/1973 | Howell | |
| 4,847,510 A | 7/1989 | Douglas | |

(Continued)

FOREIGN PATENT DOCUMENTS

| | | |
|---|---|---|
| CA | 2362712 | 8/2000 |
| CN | 102473308 | 5/2012 |

(Continued)

OTHER PUBLICATIONS

Jason Geng: "Structured-light 3D surface imaging: a tutorial", Advances in Optics and Photonics, vol. 3, No. 2, Mar. 31, 2011 (Mar. 31, 2011), p. 128-160, XP055033088, DOI: 10.1364/AOP.3. 000128.

(Continued)

*Primary Examiner* — James T Boylan
(74) *Attorney, Agent, or Firm* — Fitch, Even, Tabin & Flannery LLP

(57) ABSTRACT

An inspection system and related methods that employ directional light for enhanced imaging are provided. The inspection system includes an inspection camera and at least one directional light source positionable in an offset position from a field of view of the inspection camera. The at least one directional light source is configured to emit directional light from the offset position into the field of view of the inspection camera so as to produce shadows on a surface of interest. Further, the inspection system includes a display device coupled to the inspection camera and the inspection camera is configured to capture one or more images of the shadows produced on the surface of interest. The display device is configured to receive and display the one or more images.

18 Claims, 14 Drawing Sheets

BSI Pushes Through
Final Length,
Actuating Flip Out
Light

(51) Int. Cl.
H04N 23/56    (2023.01)
H04N 23/50    (2023.01)

(56)                References Cited

U.S. PATENT DOCUMENTS

| | | | | |
|---|---|---|---|---|
| 5,610,994 | A | 3/1997 | Stadtfeld | |
| 6,665,441 | B1 | 12/2003 | Nishio | |
| 6,700,668 | B2 | 3/2004 | Mundy | |
| 6,901,160 | B2 | 5/2005 | Chapman | |
| 6,987,876 | B2 | 1/2006 | Silber | |
| 7,033,979 | B2 | 4/2006 | Herwig | |
| 7,427,262 | B2 | 9/2008 | Bonningue | |
| 7,543,518 | B2 | 6/2009 | Buckingham | |
| 8,028,936 | B2 | 10/2011 | Mcdermott | |
| 8,069,747 | B2 | 12/2011 | Buckingham | |
| 8,144,411 | B2 | 3/2012 | Yazdanfar | |
| 8,194,948 | B2 | 6/2012 | Hori | |
| 8,200,042 | B2 | 6/2012 | Doi | |
| 8,238,642 | B2 | 8/2012 | Wu | |
| 8,248,465 | B2 | 8/2012 | Doi | |
| 8,277,647 | B2 | 10/2012 | Rice | |
| 8,285,362 | B2* | 10/2012 | Dietz | A61B 8/445 |
| | | | | 600/439 |
| 8,480,563 | B2 | 7/2013 | Nakano | |
| 8,493,558 | B2 | 7/2013 | Asada | |
| 8,558,879 | B2 | 10/2013 | Doi | |
| 8,562,516 | B2* | 10/2013 | Saadat | A61B 1/0008 |
| | | | | 600/173 |
| 8,602,722 | B2 | 12/2013 | George | |
| 8,768,046 | B2 | 7/2014 | Ernst | |
| 8,913,110 | B2 | 12/2014 | Hori | |
| 8,965,103 | B2 | 2/2015 | Hori | |
| 9,036,142 | B2 | 5/2015 | Ahner | |
| 9,046,496 | B2 | 6/2015 | Tsai | |
| 9,138,782 | B2 | 9/2015 | Dorshimer | |
| 9,251,582 | B2 | 2/2016 | Lim | |
| 9,271,637 | B2* | 3/2016 | Farr | A61B 1/042 |
| 9,275,473 | B2 | 3/2016 | Hori | |
| 9,300,926 | B2 | 3/2016 | Kell | |
| 9,392,230 | B2 | 7/2016 | Yokota | |
| 9,412,189 | B2 | 8/2016 | Bendall | |
| 9,739,168 | B2 | 8/2017 | Ekanayake | |
| 9,926,517 | B2 | 3/2018 | Tibbetts | |
| 9,932,854 | B1 | 4/2018 | Tibbetts | |
| 9,939,386 | B2 | 4/2018 | Lewis | |
| 9,951,647 | B2 | 4/2018 | Rawson | |
| 9,957,066 | B2 | 5/2018 | Bewlay | |
| 9,984,474 | B2 | 5/2018 | Bendall | |
| 10,005,111 | B2 | 6/2018 | Eriksen | |
| 10,018,113 | B2 | 7/2018 | Bewlay | |
| 10,074,169 | B2* | 9/2018 | Niedermeier | H04N 23/56 |
| 10,104,313 | B2 | 10/2018 | Slavens | |
| 10,126,117 | B1 | 11/2018 | Byers | |
| 10,147,176 | B1 | 12/2018 | Sones | |
| 10,227,891 | B2 | 3/2019 | Eriksen | |
| 10,255,519 | B2 | 4/2019 | Nagatomo | |
| 10,290,113 | B2 | 5/2019 | Akagi | |
| 10,294,492 | B2 | 5/2019 | Carlos | |
| 10,323,539 | B2 | 6/2019 | Bewlay | |
| 10,377,968 | B2 | 8/2019 | Brooks | |
| 10,385,723 | B2 | 8/2019 | Flynn | |
| 10,504,220 | B2 | 12/2019 | Lim | |
| 10,536,617 | B2 | 1/2020 | Liang | |
| 10,564,111 | B2 | 2/2020 | Safai | |
| 10,634,004 | B2 | 4/2020 | Giljohann | |
| 10,636,148 | B1 | 4/2020 | Chen | |
| 10,641,622 | B2 | 5/2020 | Sternklar | |
| 10,669,885 | B2 | 6/2020 | Pecchiol | |
| 10,693,479 | B2 | 6/2020 | Jenkins | |
| 10,699,149 | B2 | 6/2020 | Bendall | |
| 10,740,913 | B2 | 8/2020 | Shi | |
| 10,742,958 | B2 | 8/2020 | Yamamoto | |
| 10,775,315 | B2 | 9/2020 | Mekala | |
| 10,835,102 | B2 | 11/2020 | Ganapati | |
| 10,909,702 | B2 | 2/2021 | Ono | |
| 10,920,181 | B2 | 2/2021 | Martin | |
| 11,022,560 | B2 | 6/2021 | Kato | |
| 11,027,317 | B2 | 6/2021 | Tibbetts | |
| 11,084,169 | B2 | 8/2021 | Graham | |
| 11,116,050 | B1* | 9/2021 | Bhogal | H05B 6/6447 |
| 11,143,357 | B2 | 10/2021 | Zhang | |
| 11,213,615 | B2 | 1/2022 | Xing | |
| 11,288,789 | B1 | 3/2022 | Chen | |
| 11,410,298 | B2 | 8/2022 | Finn | |
| 11,441,446 | B2 | 9/2022 | Rawson | |
| 11,994,476 | B2 | 5/2024 | Li | |
| 2001/0030744 | A1 | 10/2001 | Chang | |
| 2002/0009218 | A1* | 1/2002 | Chapman | G06T 7/0002 |
| | | | | 382/141 |
| 2002/0193664 | A1 | 12/2002 | Ross | |
| 2003/0234941 | A1 | 12/2003 | Mundy | |
| 2005/0234296 | A1 | 10/2005 | Saadat | |
| 2005/0281520 | A1 | 12/2005 | Kehoskie | |
| 2005/0288555 | A1* | 12/2005 | Binmoeller | A61B 5/6882 |
| | | | | 600/300 |
| 2006/0183977 | A1 | 8/2006 | Ishigami | |
| 2008/0240491 | A1 | 10/2008 | Hori | |
| 2009/0092278 | A1 | 4/2009 | Doi | |
| 2009/0167847 | A1 | 7/2009 | Doi | |
| 2010/0128115 | A1 | 5/2010 | Nakano | |
| 2010/0150406 | A1 | 6/2010 | Xiao | |
| 2010/0158362 | A1 | 6/2010 | Lang | |
| 2011/0018987 | A1 | 1/2011 | Doi | |
| 2011/0221877 | A1 | 9/2011 | Hori | |
| 2012/0019653 | A1 | 1/2012 | Hori | |
| 2012/0327252 | A1 | 12/2012 | Nichols | |
| 2013/0093866 | A1 | 4/2013 | Ohlhues | |
| 2013/0135457 | A1 | 5/2013 | Kell | |
| 2014/0002630 | A1 | 1/2014 | Yokota | |
| 2014/0055604 | A1 | 2/2014 | Delaney | |
| 2014/0098091 | A1 | 4/2014 | Hori | |
| 2014/0133697 | A1 | 5/2014 | Singamsetti et al. | |
| 2014/0152790 | A1 | 6/2014 | Saito | |
| 2014/0163717 | A1 | 6/2014 | Das | |
| 2014/0207419 | A1 | 7/2014 | Messinger | |
| 2015/0159122 | A1 | 6/2015 | Tibbetts | |
| 2015/0168263 | A1 | 6/2015 | Mueller | |
| 2015/0317816 | A1 | 11/2015 | Bendall | |
| 2016/0073855 | A1* | 3/2016 | Farr | A61B 1/0676 |
| | | | | 600/109 |
| 2016/0221262 | A1 | 8/2016 | Das | |
| 2016/0266046 | A1 | 9/2016 | Kuai | |
| 2016/0284084 | A1 | 9/2016 | Gurcan | |
| 2016/0284103 | A1 | 9/2016 | Huang | |
| 2017/0165721 | A1 | 6/2017 | Tibbetts | |
| 2017/0167290 | A1 | 6/2017 | Kulkarni | |
| 2017/0191376 | A1 | 7/2017 | Eriksen | |
| 2017/0204739 | A1 | 7/2017 | Rawson | |
| 2017/0254217 | A1 | 9/2017 | Eriksen | |
| 2017/0318205 | A1 | 11/2017 | Duckett, III | |
| 2018/0003161 | A1 | 1/2018 | Michini | |
| 2018/0013959 | A1 | 1/2018 | Slavens | |
| 2018/0103246 | A1 | 4/2018 | Yamamoto | |
| 2018/0114304 | A1 | 4/2018 | Chen | |
| 2018/0149038 | A1 | 5/2018 | Eriksen | |
| 2018/0155060 | A1 | 6/2018 | Dauenhauer | |
| 2018/0180534 | A1 | 6/2018 | Noda | |
| 2018/0216036 | A1 | 8/2018 | Tibbetts | |
| 2018/0237163 | A1 | 8/2018 | Bewlay | |
| 2018/0245477 | A1 | 8/2018 | Kulkarni | |
| 2018/0258787 | A1 | 9/2018 | Tibbetts | |
| 2018/0289240 | A1 | 10/2018 | Aoyama | |
| 2018/0291803 | A1 | 10/2018 | Belay | |
| 2018/0298781 | A1 | 10/2018 | Tibbetts | |
| 2018/0313225 | A1 | 11/2018 | Millhaem | |
| 2018/0331269 | A1 | 11/2018 | Nishide | |
| 2018/0355751 | A1 | 12/2018 | Tibbetts | |
| 2019/0153890 | A1 | 5/2019 | Eriksen | |
| 2019/0220968 | A1 | 7/2019 | Kato | |
| 2019/0228514 | A1 | 7/2019 | Hestand | |
| 2019/0279380 | A1 | 9/2019 | Bendall | |
| 2019/0285980 | A1 | 9/2019 | Yoshikawa | |
| 2019/0323378 | A1 | 10/2019 | Tibbetts | |
| 2019/0330997 | A1* | 10/2019 | Norton | G01N 21/954 |

(56) References Cited

U.S. PATENT DOCUMENTS

| | | | | |
|---|---|---|---|---|
| 2019/0338666 A1 | 11/2019 | Finn | | |
| 2019/0339165 A1 | 11/2019 | Finn | | |
| 2019/0340805 A1 | 11/2019 | Xiong | | |
| 2019/0362486 A1 | 11/2019 | Diao | | |
| 2020/0056501 A1 | 2/2020 | Eastment | | |
| 2020/0082526 A1 | 3/2020 | Murphy | | |
| 2020/0213563 A1 | 7/2020 | Morice | | |
| 2020/0319119 A1* | 10/2020 | Peters | | G02B 23/2476 |
| 2020/0346310 A1* | 11/2020 | Huttner | | B23Q 9/0007 |
| 2021/0108537 A1 | 4/2021 | Rigg | | |
| 2021/0132598 A1* | 5/2021 | Schleif | | F23N 5/242 |
| 2021/0172837 A1 | 6/2021 | Pulisciano | | |
| 2021/0281748 A1 | 9/2021 | Nogami | | |
| 2021/0312702 A1 | 10/2021 | Holzer et al. | | |
| 2021/0317752 A1 | 10/2021 | Deja | | |
| 2021/0396683 A1 | 12/2021 | Zhang | | |
| 2022/0051395 A1* | 2/2022 | Vandam | | G06T 7/0006 |
| 2022/0061638 A1 | 3/2022 | Hinding | | |
| 2022/0314430 A1* | 10/2022 | Graham | | B25J 9/06 |
| 2022/0358638 A1 | 11/2022 | Ojima | | |
| 2023/0000328 A1* | 1/2023 | Govrin | | A61B 1/00183 |
| 2023/0016982 A1 | 1/2023 | Graham | | |
| 2023/0018458 A1 | 1/2023 | Graham | | |
| 2023/0018554 A1 | 1/2023 | Graham | | |
| 2023/0334644 A1 | 10/2023 | Ojima | | |
| 2024/0159711 A1* | 5/2024 | Kommareddy | | G02B 23/2476 |
| 2026/0032328 A1 | 1/2026 | Kommareddy | | |

FOREIGN PATENT DOCUMENTS

| | | | |
|---|---|---|---|
| CN | 102944928 | | 2/2013 |
| CN | 102944928 | B | 7/2015 |
| CN | 105960569 | | 9/2016 |
| CN | 106416225 | | 2/2017 |
| CN | 106934794 | | 7/2017 |
| CN | 110047103 | | 7/2019 |
| CN | 111433574 | | 7/2020 |
| CN | 112136154 | | 12/2020 |
| CN | 214368947 | | 10/2021 |
| CN | 214965296 | | 12/2021 |
| DE | 102013202616 | A1 | 8/2014 |
| DE | 102015006330 | | 11/2016 |
| EP | 2170565 | | 4/2010 |
| EP | 3643451 | | 4/2020 |
| EP | 3643452 | | 4/2020 |
| FR | 2965388 | B1 | 10/2012 |
| JP | 2009168499 | A | 7/2009 |
| JP | 2009282379 | A | 12/2009 |
| JP | 2010008394 | A | 1/2010 |
| JP | 2011161019 | A | 8/2011 |
| JP | 5186314 | B2 | 4/2013 |
| JP | 2013059664 | | 4/2013 |
| JP | 5307407 | B2 | 10/2013 |
| JP | 5361246 | B2 | 12/2013 |
| JP | 5390011 | | 1/2014 |
| JP | 5602449 | B2 | 10/2014 |
| JP | 2017040932 | A | 2/2017 |
| JP | 6373322 | B2 | 8/2018 |
| JP | 6810711 | | 1/2021 |
| WO | WO 2009144729 | * | 12/2009 | A61B 1/0008 |
| WO | 2020022474 | A1 | 1/2020 |
| WO | 2020030516 | A1 | 2/2020 |
| WO | 2020110576 | | 6/2020 |
| WO | 2020219076 | | 10/2020 |
| WO | 2021094534 | | 5/2021 |

OTHER PUBLICATIONS

Lim Ser Nam et al: "Automatic Registration of Smooth Object Image to 3D CAD Model for Industrial Inspection Applications", 2013 International Conference on 3D Vision, IEEE, Jun. 29, 2013 (Jun. 29, 2013), pp. 79-86, XP032480418, DOI: 10.1109/3DV.2013. 19.

U.S. Appl. No. 17/985,501; Application filed Nov. 11, 2022, entitled "Inspection Systems and Methods Employing Different Wavelength Directional Light For Enhanced Imaging".

U.S. Appl. No. 17/373,920; Non-Final Rejection mailed Sep. 28, 2023 (pp. 1-17).

U.S. Appl. No. 17/373,917; Non-Final Rejection mailed Nov. 16, 2023; (pp. 1-16).

U.S. Appl. No. 17/373,920; Final Rejection mailed Feb. 12, 2024; (pp. 1-20).

U.S. Appl. No. 17/373,925; Non-Final Rejection mailed Nov. 14, 2023; (pp. 1-12).

U.S. Appl. No. 17/373,925; Non-Final Rejection mailed Aug. 26, 2024; (pp. 1-17).

U.S. Appl. No. 17/373,917; Final Rejection mailed Apr. 16, 2024; (pp. 1-22).

U.S. Appl. No. 17/373,917; Non-Final Rejection mailed Aug. 1, 2024; (pp. 1-25).

U.S. Appl. No. 17/373,920; Non-Final Rejection mailed Jun. 7, 2024; (pp. 1-20).

U.S. Appl. No. 17/373,925; Final Rejection mailed Mar. 25, 2024; (pp. 1-14).

U.S. Appl. No. 17/373,920; Final Rejection mailed Nov. 4, 2024; (pp. 1-24).

U.S. Appl. No. 17/373,917; Final Rejection mailed Feb. 14, 2025; (pp. 1-23).

U.S. Appl. No. 17/373,920; Non-Final Rejection mailed Feb. 11, 2025; (pp. 1-26).

U.S. Appl. No. 17/373,925; Final Rejection mailed Feb. 11, 2025; (pp. 1-15).

U.S. Appl. No. 17/985,501; Non-Final Rejection mailed May 14, 2025; (pp. 1-14).

U.S. Appl. No. 17/985,501; Non-Final Rejection mailed May 14, 2025; (pp. 1-44).

Waygate Technologies Brochure: Everest Mentor Visual iQ+ VideoProbe; 12 pgs.; Oct. 2024; (extension://efaidnbmnn-nibpcajpcglclefindmkaj/https://dam.bakerhughes.com/m/206c48e427981e2f/original/BHCS33632B-Mentor-ViQ-Brochure_R8-pdf.pdf).

Waygate Technologies, Everest Mentor Visual iQ+ VideoProbe product specification, Jan. 2024, 12 pp.

USPTO; U.S. Appl. No. 17/373,917; Non-Final Rejection mailed Aug. 11, 2025; (pp. 1-23).

USPTO; U.S. Appl. No. 17/373,920; Final Rejection mailed Jun. 4, 2025; (pp. 1-28).

USPTO; U.S. Appl. No. 17/373,925; Non-Final Rejection mailed Jun. 17, 2025; (pp. 1-19).

USPTO; U.S. Appl. No. 17/373,925; Non-Final Rejection mailed Jun. 17, 2025; (pp. 1-26).

USPTO; U.S. Appl. No. 17/985,501; Final Rejection mailed Nov. 13, 2025; (pp. 1-12).

USPTO; U.S. Appl. No. 17/373,917; Notice of Allowance and Fees Due (PTOL-85) mailed Jan. 28, 2026; (pp. 1-12).

USPTO; U.S. Appl. No. 17/985,501; Notice of Allowance and Fees Due (PTOL-85) mailed Jan. 28, 2026; (pp. 1-8).

* cited by examiner

BSI Pushes Through
Final Length,
Actuating Flip Out
Light

300

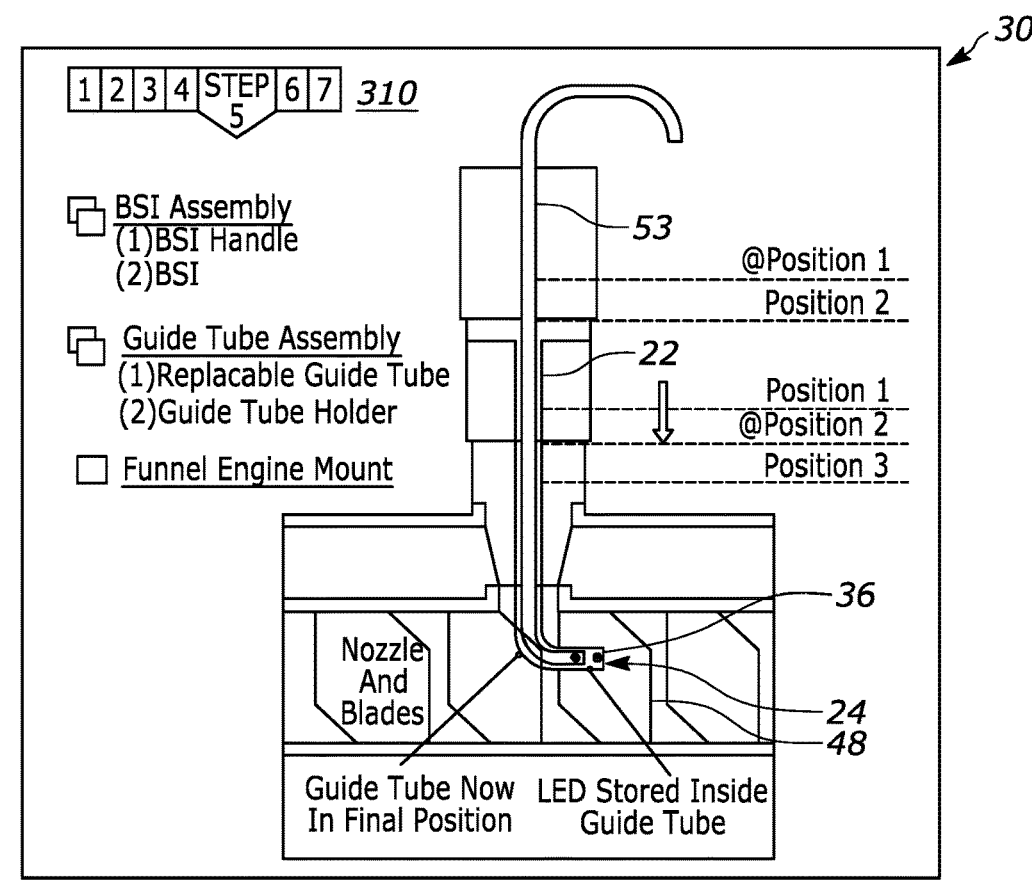

1 2 3 4 STEP 5 6 7  *310*

☐ BSI Assembly
  (1)BSI Handle
  (2)BSI

☐ Guide Tube Assembly
  (1)Replacable Guide Tube
  (2)Guide Tube Holder

☐ Funnel Engine Mount

53

@Position 1
Position 2

22

Position 1
@Position 2
Position 3

36
24
48

Nozzle
And
Blades

Guide Tube Now    LED Stored Inside
In Final Position    Guide Tube

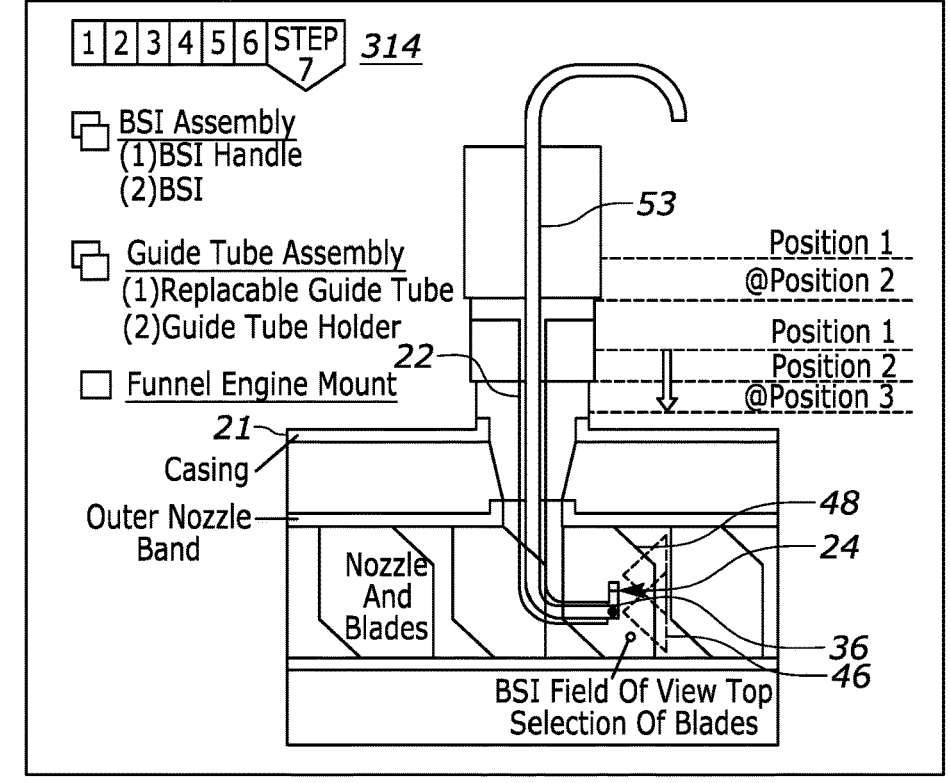

1 2 3 4 5 6 STEP 7  *314*

☐ BSI Assembly
  (1)BSI Handle
  (2)BSI

☐ Guide Tube Assembly
  (1)Replacable Guide Tube
  (2)Guide Tube Holder

☐ Funnel Engine Mount

21
Casing

Outer Nozzle
Band

Nozzle
And
Blades

53

Position 1
@Position 2

Position 1
Position 2
@Position 3

22

48
24

36
46

BSI Field Of View Top
Selection Of Blades

FIG. 5C (Continued)

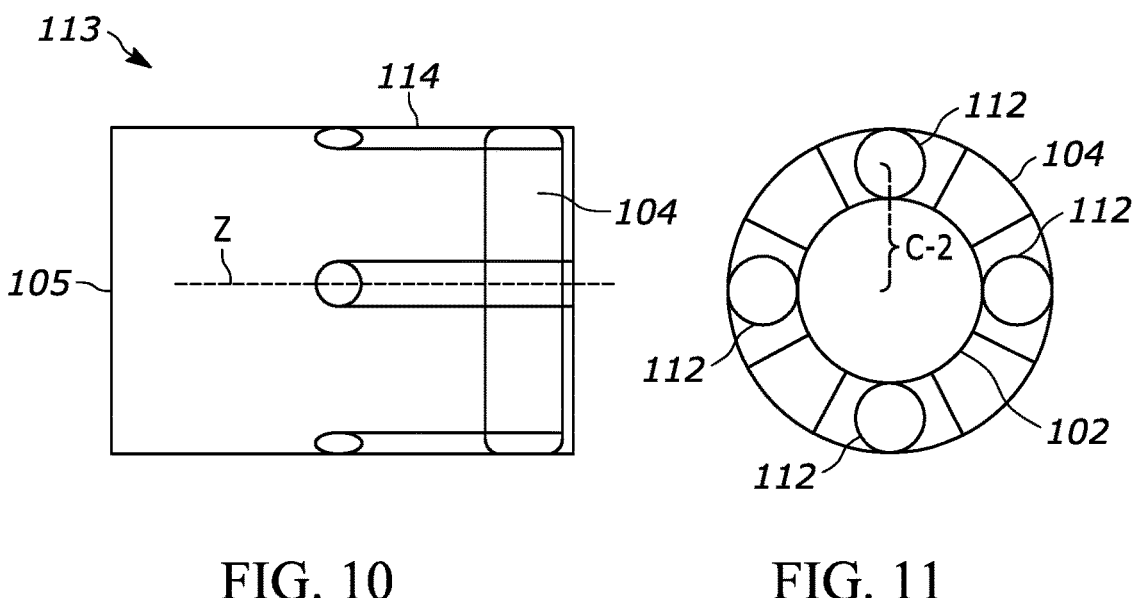
FIG. 10                  FIG. 11
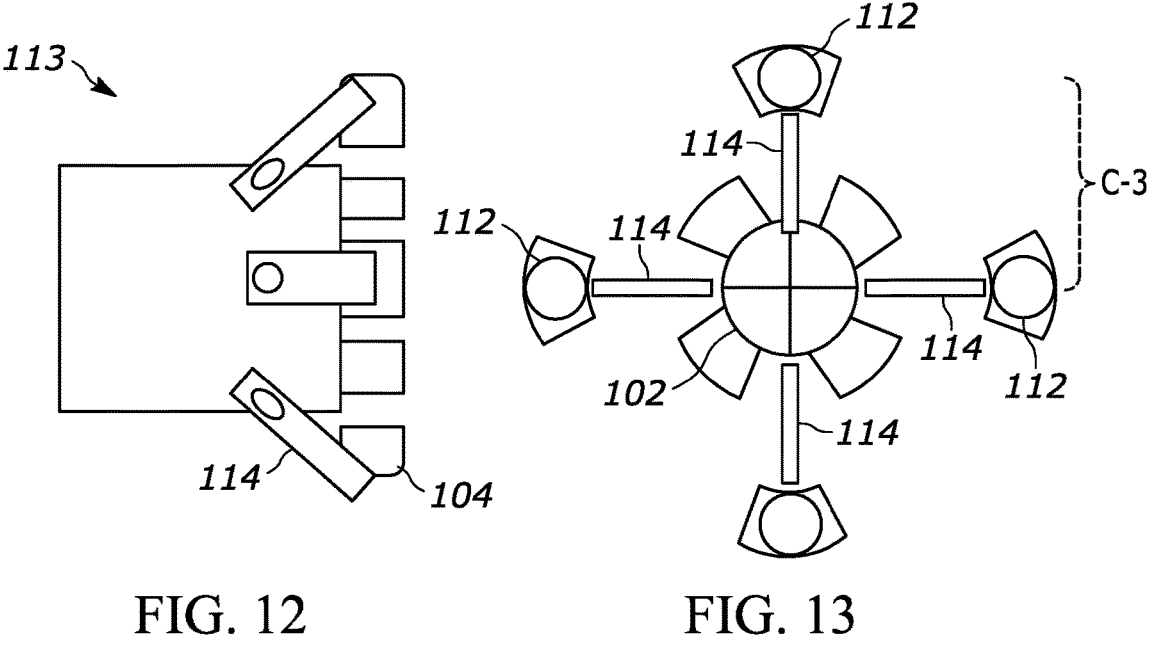
FIG. 12                  FIG. 13

*400*

402 Output A Sequence Of Different Directional Light From A Lighting Array Of An Inspection System To Illuminate A Surface Of Interest 404 Capture A Plurality Of Image Frames With The Inspection Camera While The Sequence Of Different Directional Light Is Being Output 406 Process The Plurality Of Images Frames To Identify Abnormal Regions Of The Surface Of Interest

INSPECTION SYSTEMS AND METHODS EMPLOYING DIRECTIONAL LIGHT FOR ENHANCED IMAGING

CROSS REFERENCE TO RELATED APPLICATIONS

This application is related to U.S. patent application Ser. No. 17/985,501, filed on Nov. 11, 2022, entitled, "Inspection Systems and Methods Employing Different Wavelength Directional Light For Enhanced Imaging" the entirety of which is incorporated herein by reference.

TECHNICAL FIELD

These teachings relate generally to inspection systems for mechanical systems, devices, and objects including machine components, jet engines, and the like. More particularly, these teachings relate to an inspection system that employs directional light for enhanced imaging.

BACKGROUND

Complex mechanical system, devices, and objects can develop wear and tear from general use that can degrade performance and, in some instances, lead to unintended operational failure. This wear and tear can occur at various locations of the systems, devices, and objects including hard to inspect interior areas. As such, imaging systems such as borescopes and the like are used to image these internal areas for proper inspection.

BRIEF DESCRIPTION OF THE DRAWINGS

Various needs are at least partially met through provision of the inspection system employing directional light for enhanced imaging described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 10 comprises a partial side view of an extendable light ring and front camera arrangement as configured in accordance with various embodiments of these teachings;

FIG. 11 comprises a front view of an extendable light ring and front camera arrangement as configured in accordance with various embodiments of these teachings;

FIG. 12 comprises a partial side view of an extendable light ring and front camera arrangement as configured in accordance with various embodiments of these teachings;

FIG. 13 comprises a front view of an extendable light ring and front camera arrangement as configured in accordance with various embodiments of these teachings;

Figure 1:
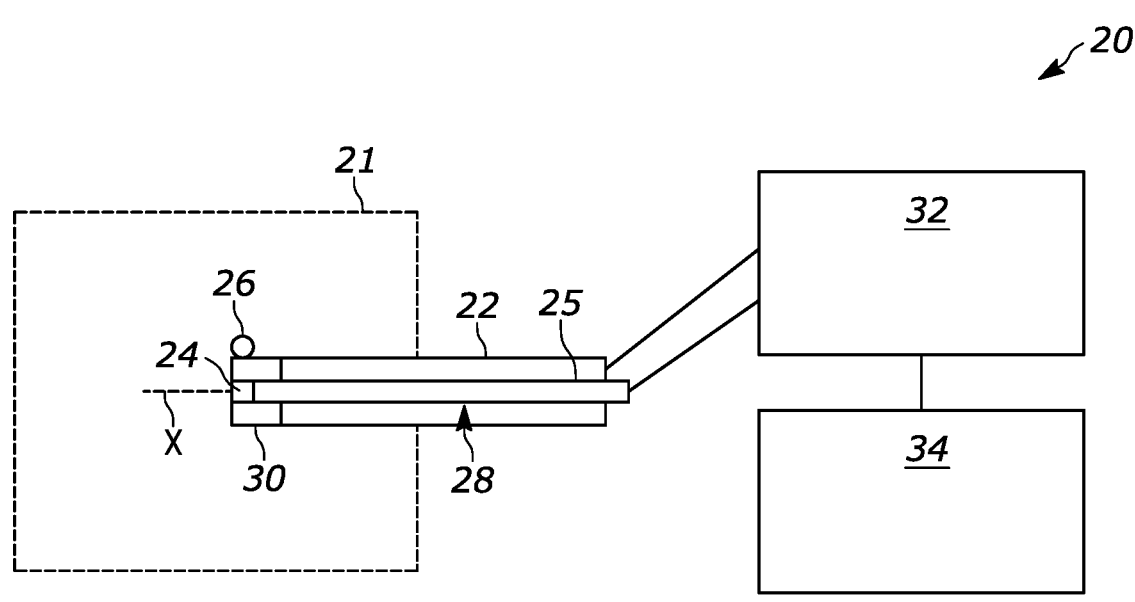
FIG. 1 comprises an inspection system for a device in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that may be useful in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Current inspection systems for devices such as jet engines and the like typically include a single camera inspection borescope having a lighting arrangement configured to broadcast diffuse light from a position substantially adjacent to the primary lens or imaging device of the borescope. This diffused lighting arrangement can provide a substantially uniform intensity of light across an interior of the device into which the borescope is inserted. However, the probability of detecting wear and tear problems such as cracks and other distress on the devices is reduced by the uniform intensity of the diffused light.

Borescopes may also employ imaging sensors or devices to present an operator with an image of an interior surface of a device, and/or to record such an image for later recall. The use of light sources positioned adjacent to the primary lens of the imaging sensors or devices often results in an even illumination of the surface, which is sometimes described as a "flat illumination." However, it may be difficult to discern surface contours in images taken under this "flat illumination" condition due to the lack of variation of surface illumination. In particular, the "flat illumination" may make it difficult to see certain features or defects such as thin cracks.

The various aspects of the present disclosure overcome this defect by offsetting the light from the imaging sensor or device in a range of between about 3 mm and about 30 mm, so as to create differences of illumination over the interior surface. Specifically, employing offset directional lights, as described herein, in which the illumination of a surface of interest varies with the angles between the lights and the camera can greatly increase contrast in images as compared with standard diffuse light illumination. In particular, defects or other sharp edged features may even throw or cast shadows in the image as a result of the emitted directional light, which greatly increases the contrast of such sharp edged features in the image.

Generally speaking, the various aspects of the present disclosure can be employed with an inspection system for a device and related methods. In some embodiments, the inspection system can include a single directional light source positionable in an offset position from a field of view of an inspection camera such as a borescope. The single directional light source can be configured to emit directional light from the offset position onto a surface of interest in the field of view of the inspection camera so as to produce shadows on the surface of interest. The inspection camera can capture one or more images of the shadows produced on the surface of interest and send those one or more images to a display device where they can be displayed and reviewed by a user or operator to identify anomalies or defects.

Further, in some embodiments, the inspection system can include an inspection camera, a lighting array collocated with the inspection camera, a controller electrically coupled to the inspection camera and the lighting array, and a post processing system. The controller can be configured to direct different sets of one or more lights of the lighting array to output a sequence of pulses of light to illuminate a surface of interest from different directions and to direct the inspection camera to capture a plurality of image frames, each frame corresponding to one of the pulses of light from one of the different directions. Further, the post processing system can be configured to receive the plurality of image frames and process the plurality of image frames to identify, for example, abnormal regions of the surface of interest, surface curvature and contours of the surface of interest, and the like. In general, the directionally broadcast light and post processing procedures can provide enhanced contrast images of the part to be inspected. Such enhancement can also be with respect to the ability to discern minute surface variation and defects in the device.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Referring now to the drawings, and in particular to FIG. 1, an inspection system 20 for an object 21 that is compatible with many of these teachings will now be presented. The inspection system 20 can include an insertion tool 22, an inspection camera 24 with a connection cable 25, and a directional light source 26 positionable in an offset position from a central axis Y (see FIG. 4) of the inspection camera 24. The insertion tool 22 can be configured to be fed into an interior region 23 of the object 21 and can include a hollow interior 28 configured to receive at least a portion of the inspection camera 24 and to enable insertion of the inspection camera 24 into the interior of the object 21. The object 21 can include a mechanical system, device, or object such as machine components, jet engines, or the like.

Figure 2:
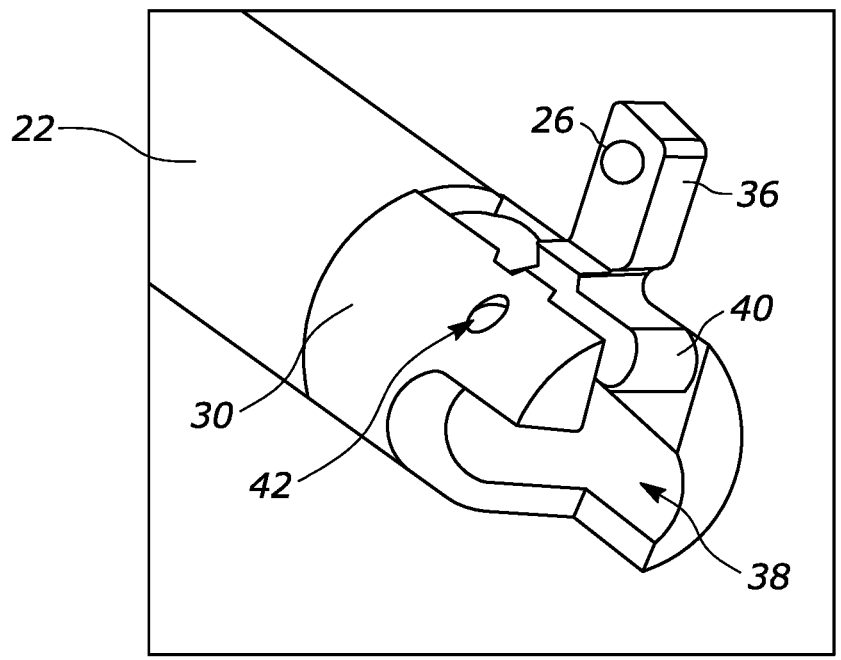
FIG. 2 comprises a perspective view of an insertion tool and housing in accordance with various embodiments of these teachings.

Further, as seen in FIGS. 1-2, the inspection system 20 can include a housing 30 configured to support and orient the directional light source 26 in the offset position. The housing 30 can be coupled to an end of the insertion tool 22 that is fed into the interior of the object 21. Various embodiments for the directional light source 26 are contemplated including a single LED or similar light sources known in the art that can be angled to emit light in a preconfigured direction.

Continuing with FIG. 1, the inspection system 20 can include a controller 32 electrically coupled to the inspection camera 24 via the connection cable 25 and the directional light source 26 and a display device 34 electrically coupled to the controller 32. The controller 32 can be configured to activate and deactivate the directional light source 26, to direct the inspection camera 24 to capture one or more images of the interior of the object 21, and to send the one or more images to the display device 34 for displaying thereon. Various embodiments for the controller 32 are contemplated, such as simple electric or mechanical switches, microcontrollers, computer processors, and other similar devices known to those of skill in the art. In some embodiments, the display device 34 can be integrated with the controller 32. Further still, in some embodiments, the controller 32 can comprise separate distinct respective circuitry, components, etc. for directing the operation of the inspection camera 24 and the directional light source 26.

Turning now to FIG. 2, a perspective view of the housing 30 is shown. The housing 30 can include a positionable arm 36 including a first portion that includes and supports the directional light source 26. The positionable arm 36 has a stowed configuration where the first portion of the positionable arm 36 is stowed within a recess of the housing 30 and a deployed configuration, as shown in FIG. 2, in which the first portion of the positionable arm 36 is deployed and extends from the housing 30 such that the directional light source 26 is located in an offset position (e.g., offset from the passage 38 or housing 30).

The passage 38 can be configured to removably support the inspection camera 24 and can be open to the hollow interior 28 when the housing 30 is coupled to the insertion tool 22 so as to enable the inspection camera 24 to pass through the hollow interior 28 and into the passage 38. The positionable arm 36 can include a tab portion 40 protruding from or positioned at an angle relative to the first portion of the positionable arm 36. The tab portion 40 is configured to utilize a force applied thereto, for example by the camera 24 moving through the passage 38, to transition the first portion of the positionable arm 36 into the deployed configuration. For example, in a stowed configuration, the tab 40 is in the passage 38 and the first portion of the arm 36 is in the recess. The camera 24 moves through the passage 38, contacts the tab 40, and the positionable arm 36 pivots or rotates about an axle 42. The tab 40 rotates to the recess and the first portion of the arm 36 moves from the recess to an extended position, thereby from the stowed configuration to the deployed configuration.

Additionally or alternatively, in some embodiments, the first portion of the positionable arm 36 can linearly translate along the longitudinal axis X (see FIG. 1) relative to the housing 30 to move between the stowed configuration and the deployed configuration when a force is applied to the tab portion 40. Additionally or alternatively, in some embodiments, the first portion of the positionable arm 36 may be a flexible member which can be elastically or plastically deformed relative to the housing 30 to move between the stowed configuration and the open configuration when a force is applied to a part thereof. In some embodiments, the angle between the tab portion 40 and the first portion of the positionable arm 36 can be approximately 90 degrees.

Figure 3A:
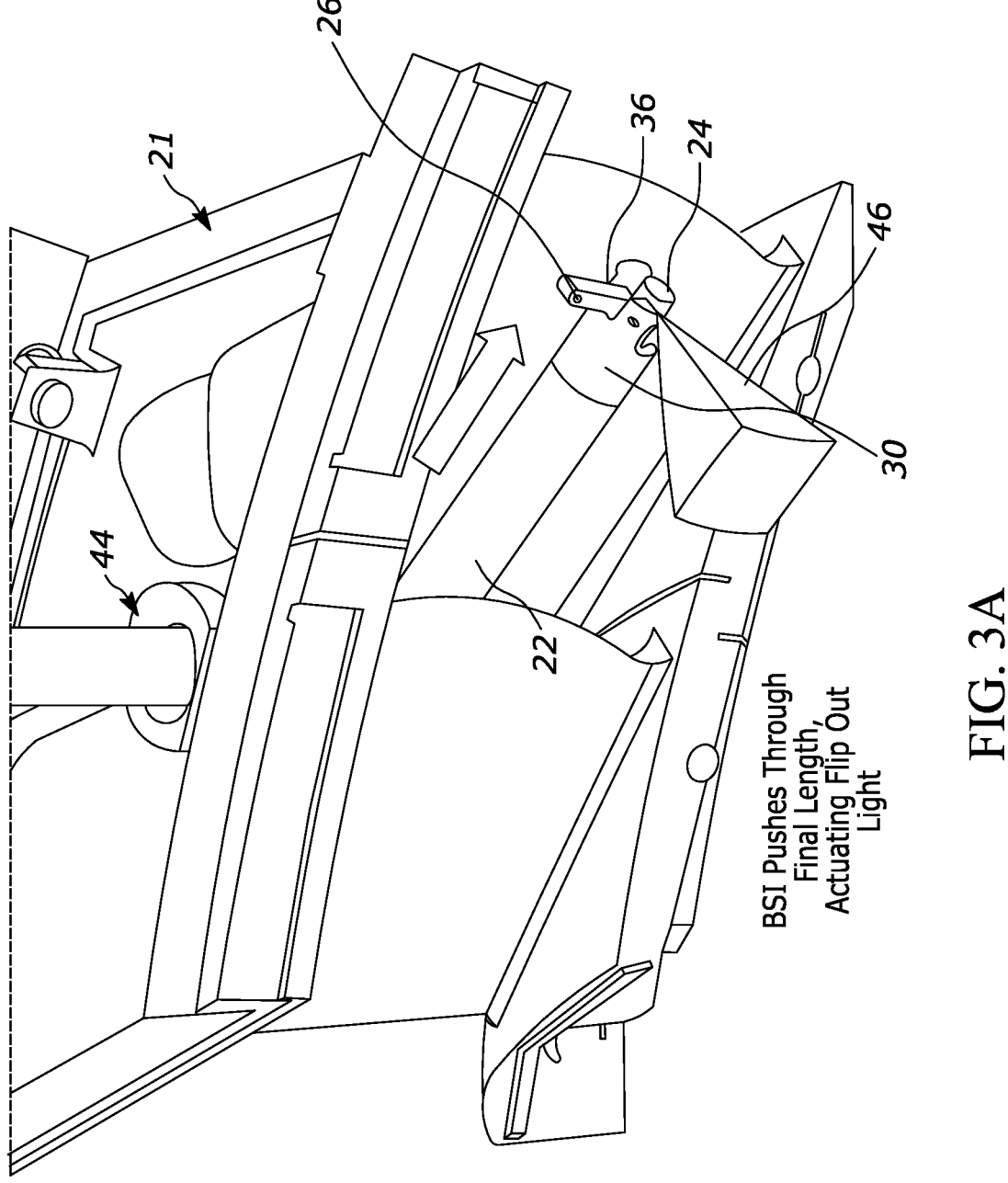
FIGS. 3A and 3B comprise schematic representations of an insertion tool inside an object in accordance with various embodiments of these teachings.

Turning now to FIG. 3A a schematic representation of the insertion tool 22 inside the object 21 is shown. As seen in FIG. 3A, the insertion tool 22 can include a flexible guide tube that is fed through an insertion port 44 in the object 21. From there, the inspection camera 24 is fed through the hollow interior 28 and into the passage 38. In some embodiments, feeding the inspection camera into the passage actuates the positionable arm 36 into the deployed configuration so that the directional light source 26 is in the offset position relative to the field of view 46 of the inspection camera 24. For example, feeding the inspection camera 24 into the passage 38 can cause the inspection camera 24 to contact the tab portion 40 and apply a force thereto which in turn can rotate or translate the positionable arm 36 into the deployed configuration. Further, as discussed in more detail below, the inspection camera 24 can continue to be fed through the hollow interior 28 out past an end of the housing 30 so as to control a distance B between a central axis Y of the inspection camera 102 (see FIG. 3B). Controlling the distance B can vary an angle A at which the directional light from the directional light source 26 is emitted onto the surface of interest 48

Figure 3B:
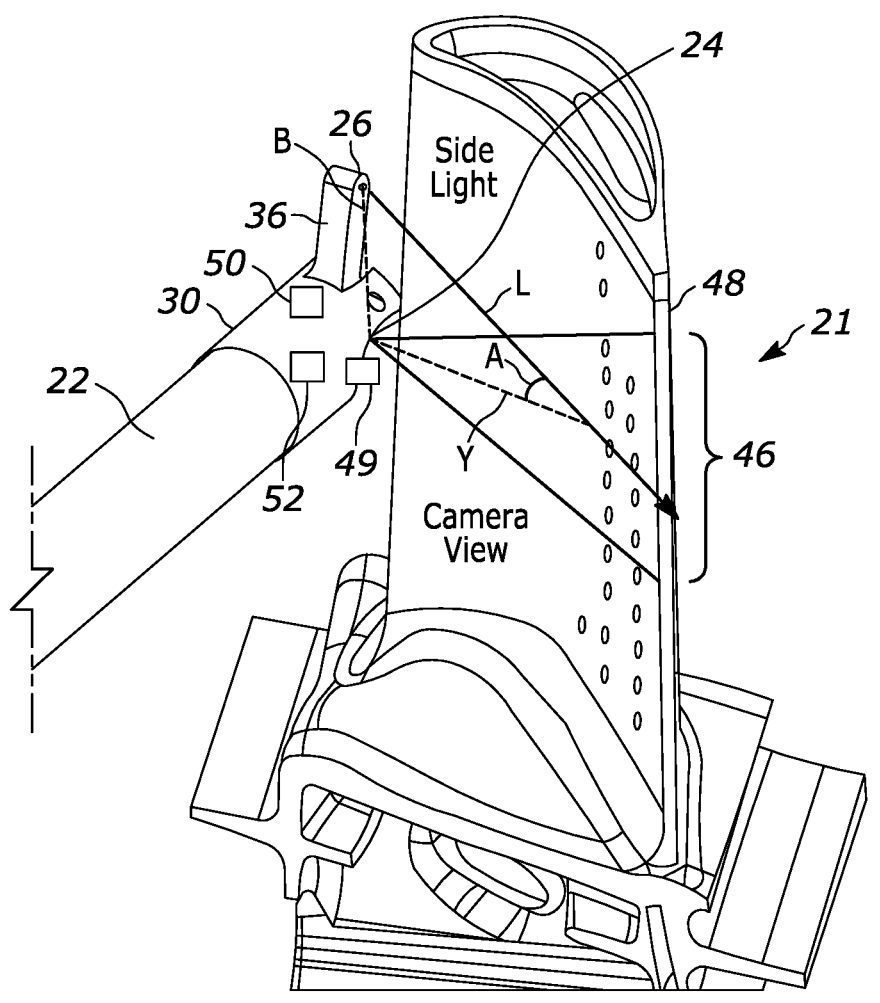

Turning now to FIG. 3B a schematic representation of the insertion tool 22 and inspection camera 24 inside the object 21 is shown. As seen in FIG. 3B, when the positionable arm 36 is in the deployed configuration and the directional light source 26 is activated (such as by the controller 32) one directional beam of light L emitted from the directional light source 26 and onto a surface of interest 48 inside the object 21 can be at the angle A with respect to a central axis Y of the inspection camera 24 and the surface of interest 48. In some embodiments the angle A can be in a range from about 5 degrees to about 45 degrees. As described in more detail herein, the angle A can be a function of the distance B between a center of the inspection camera 24 and the offset position of the directional light source 26, which, in some embodiments, can be in a range from about 3 mm to about 30 mm. The directional beam of light L can be one of a plurality of directional (e.g. not diffused) beams of light radiating outward from the directional light source 26 when activated.

The surface of interest 48 can include a turbine blade where the object 21 includes a jet engine. The surface of interest 48 can also include other similar hard to reach critical components of complex objects subject to regular maintenance and inspection. Further, when the directional beam of light L is emitted onto the surface of interest 48, the directional nature of the beam of light L can reflect of the surface of interest 48 and back into the inspection camera 24 to induce structural features of the surface of interest 48 to cast shadows into the field of view 46. These cast shadows can increase the viewability of the structural features in images captured by the inspection camera 24 that are displayed on the display device 34. In some embodiments, the inspection system 20 can include a separate diffuse light source 49 integrated with the inspection camera 24 or the housing 30. Various embodiments for the diffuse light source 49 are contemplated including a borescope ring light, one or more LED's, etc.

Further, as seen in FIG. 3B, in some embodiments, the housing 30 can include a biasing component 50. The biasing component 50 can be configured to bias the positionable arm 36 in either the deployed configuration or the stowed configuration. For example, when the biasing component 50 biases the positionable arm 36 in the deployed configuration, a force acting on the positionable arm 36 during insertion through the insertion port 44 can overcome the biasing force to temporarily depress the positionable arm 36 into the stowed configuration and then the biasing force can serve to actuate the positionable arm 36 into the deployed configuration once the housing 30 is fully fed through the insertion port 44 into the interior of the object 21. In contrast, when the biasing component 50 biases the positionable arm 36 in the stowed configuration, the biasing force can serve to secure the inspection camera 24 within the passage 38 once the inspection camera 24 has contacted the tab 40 to move the first portion of the positionable arm 36 into the deployed configuration. Various embodiments for the biasing component 50 are contemplated such as a spring, elastic, or other similar element known in the art.

Further, the housing 30 can include an actuator 52 configured to actuate the positionable arm 36 into the deployed configuration in addition to or in place of the tab 40 and movement of the inspection camera 24. Various embodiments for the actuator 52 are contemplated, such as a motor or similar electric or mechanical device coupled to the positionable arm 36 to move the positionable arm 36 between the stowed and deployed configurations. In some embodiments, the actuator 52 can include a mechanical linkage such as a string or wire that is fed through the insertion tool 22 and attaches to the positionable arm 36. The linkage can then be pulled to transition the positionable arm 36 into the deployed configuration. It will be appreciated that various other embodiments for the actuator 52 known in the art are also contemplated.

It will be appreciated by those having ordinary skill in the art that, while the foregoing description of FIGS. 1-3B depict and relate to an arrangement of the housing 30 used in connection with a side facing version of the inspection camera 24, the housing 30, including the positionable arm 36, can be configured for use with other variations of the inspection camera 24, including, but not limited to, a front facing version of the inspection camera 24. Additionally, embodiments are contemplated where the directional light source 26 is located in a separate housing from the inspection camera 24 such as on a distinct guide member or wire that can be inserted into the object 21 separately from the inspection camera 24 so as to give an operator of the inspection system 20 the ability to manually adjust the directional light source 26. In these embodiments, the housing 30 can be omitted and the inspection camera 24 and the separately housed directional light source 26 can be inserted into the interior of the object 21 via the insertion tool 22.

Figure 4A:
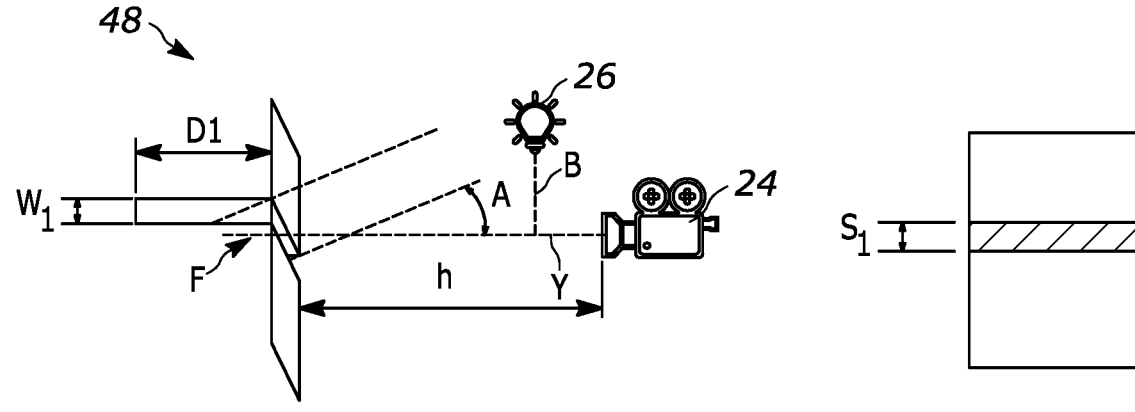
FIGS. 4A, 4B, and 4C comprise schematic representations of shadows cast by a surface of interest of an object in accordance with various embodiments of these teachings.
Figure 4B:
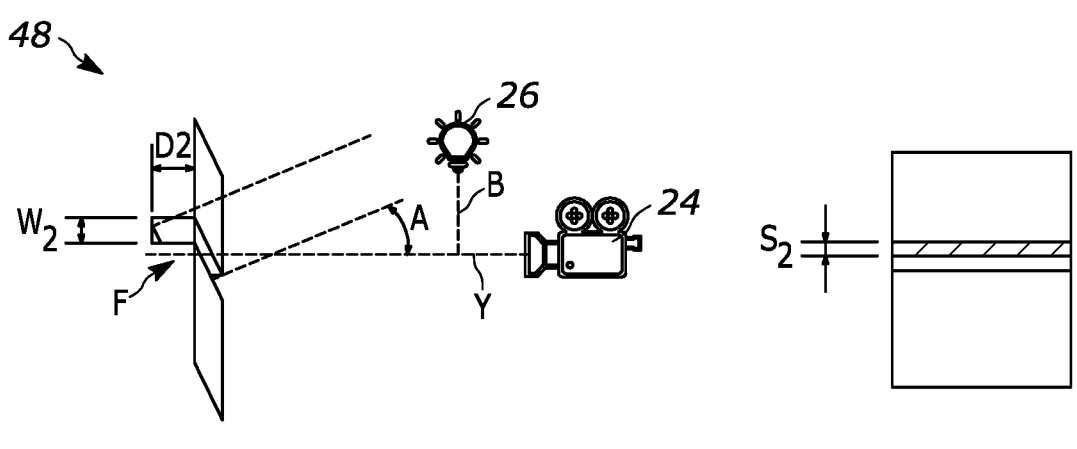
Figure 4C:
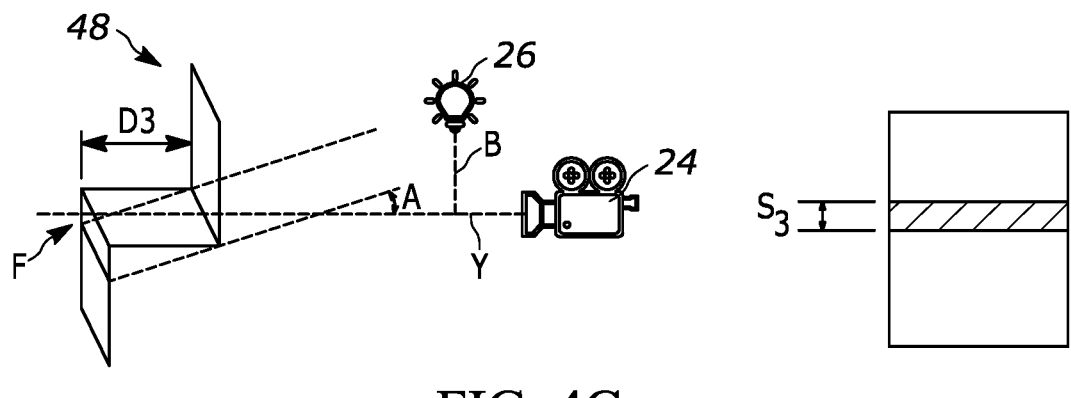

Turning now to FIGS. 4A, 4B, and 4C, the effect of the directional light source 26 with respect to shadows cast onto or by the surface of interest 48 will be discussed in more detail. By way of background, a contrast ratio that is visible in an image may be based on a difference in brightness between a pixel including a feature and a brightness of an adjacent pixel. The contrast ratio may be further based on a dynamic rage of the camera sensor.

A threshold contrast ratio of 15% for image contrast may be used to define when a feature present on the surface of interest 48 may be resolved (e.g. is discernable in an image captured by the inspection camera 24). For example, in a monochrome image, a shadow from a crack, which is 85% white (thus, 15% black), on the surface of interest 48, which is 100% white background, may be considered resolvable because its brightness is 15% different from the surroundings.

At one extreme, an ideal white object with a perfectly black shadow in a crack may produce a 100% contrast ratio of the shadow onto the surface of interest 48. This visible shadow on the surface of interest 48 can constitute a feature of interest usable to infer edges of a crack or other defect and would also present a 100% contrast ratio in an image captured by the inspection camera 24 if the feature occupies the entirety of at least one pixel.

However, if the feature is smaller than a pixel, the brightness of the feature may be diluted and affect the contrast ratio. For example, using the example in the previous paragraph, if the feature occupies, for example, 50% of one pixel, the contrast ratio may be reduced to 50% in the image (e.g., the perfectly black shadow looks grey in the pixel). Additionally, if the feature is fully imaged by one pixel, and only occupies 30% of the pixel area, the contrast ratio would be 30%. If this last feature is imaged equally by two adjacent pixels and occupies only 15% of each of the two pixels, the contrast ratio may drop to 15%.

Thus, to achieve 15% contrast in an image for a feature with 100% contrast, a reasonable pixel size for the inspection camera 24 can be elected to be equal to the expected feature size multiplied by 1/0.3. Further, for a feature with only 15% contrast, the pixel size can be selected to be equal to the expected feature size/2 so as to achieve at least 15% contrast in the image for any offset of the pixels compared to the feature.

However, in situations where the object 21 and/or the surface of interest 48 are not white, but are for example 50% grey, the contrast ratio is reduced proportionately in each of the prior examples, and the selected pixel size would be reduced to provide the 15% contrast ratio. Further, a feature on a black object may not be resolvable because any shadow in this instance would not change the brightness of a pixel of any size. In this case, specular reflectivity of a surface could be used rather than a diffuse reflectivity to create a contrast. Further still, the likelihood of detecting such a feature by specular reflection is increased if the illumination is directed from different positions, using different angles to advantageously reflect the illumination back to the imaging sensor.

When using shadows to increase contrast of features in an image, the geometry of the feature and the interaction between the illumination and the feature is also relevant. As discussed with respect to the schematic representations shown in FIGS. 4A, 4B, and 4C, the relationship between the feature F on the surface of interest 48, the inspection camera 24 and directional light source 26 is the same in each instance. However, shadows S1, S2, and S3 cast in each of FIGS. 4A, 4B, and 4C are different because of different geometry of the features present on the surface of interest 48 in each of FIGS. 4A, 4B, and 4C.

In particular, FIG. 4A shows the feature F as a deep crack feature with a depth D1 and a width W1 in which the shadow S1 is produced in response to the directional light source 26 that fills the full width W1 of the crack. FIG. 4B shows the feature F as a shallow crack feature of the surface of interest 48 with a depth D2 and a width W2. As seen in FIG. 4B, shallowness of the crack means that the width of the shadow S2 is not defined by the width W2 and is instead a function of the depth D2 and the angle A between the illumination and the central axis Y from the inspection camera 24 to the crack. In particular, the width of the shadow S2 is equal to D2*tan(A). FIG. 4C shows an edge feature with a depth D3 and no width. Because of the lack of a crack width, the width of a shadow S3 is defined, like the width of the shadow S2, by depth D3 and the angle A between the illumination and a line from the inspection camera 24 to the edge feature, or D3*tan(A). As such these differing geometries result in different features for the shadows S1, S2, and S3 despite the same positions of the inspection camera 24 and the directional light source 26.

For example, the shadow S2 in FIG. 4B is smaller than the shadow S1 in FIG. 4A despite the fact that the width W1 and W2 for the features are the same in both FIG. 4A and FIG. 4B. Additionally, the shadow S3 cast in FIG. 4C is larger than the shadow S1 from FIG. 4A despite the fact that the depth D3 of the feature in FIG. 4C is smaller than the depth D1 of the feature in FIG. 4A.

Successful resolution of the features of the surface of interest 48 in an image captured by the inspection camera 24 depends on the direction and position relationships between the inspection camera 24, the surface of interest 48, and directional light source 26. Further, other factors including dimensions and color of the features, use of specular or diffuse reflectivity of the original part, current part color (e.g. original color plus any variation due to dirt or chemical change in the surfaces), illumination color and intensity, illumination evenness and normalization, system spatial resolution, signal to noise ratio, optical imperfection in the lens and imaging sensor and other factors can effect successful resolution of the features of the surface of interest 48. In light of these facts, lens and/or imaging sensor combinations for the inspection camera 24 can be selected to account for one or all of the above considerations.

Figure 5A:
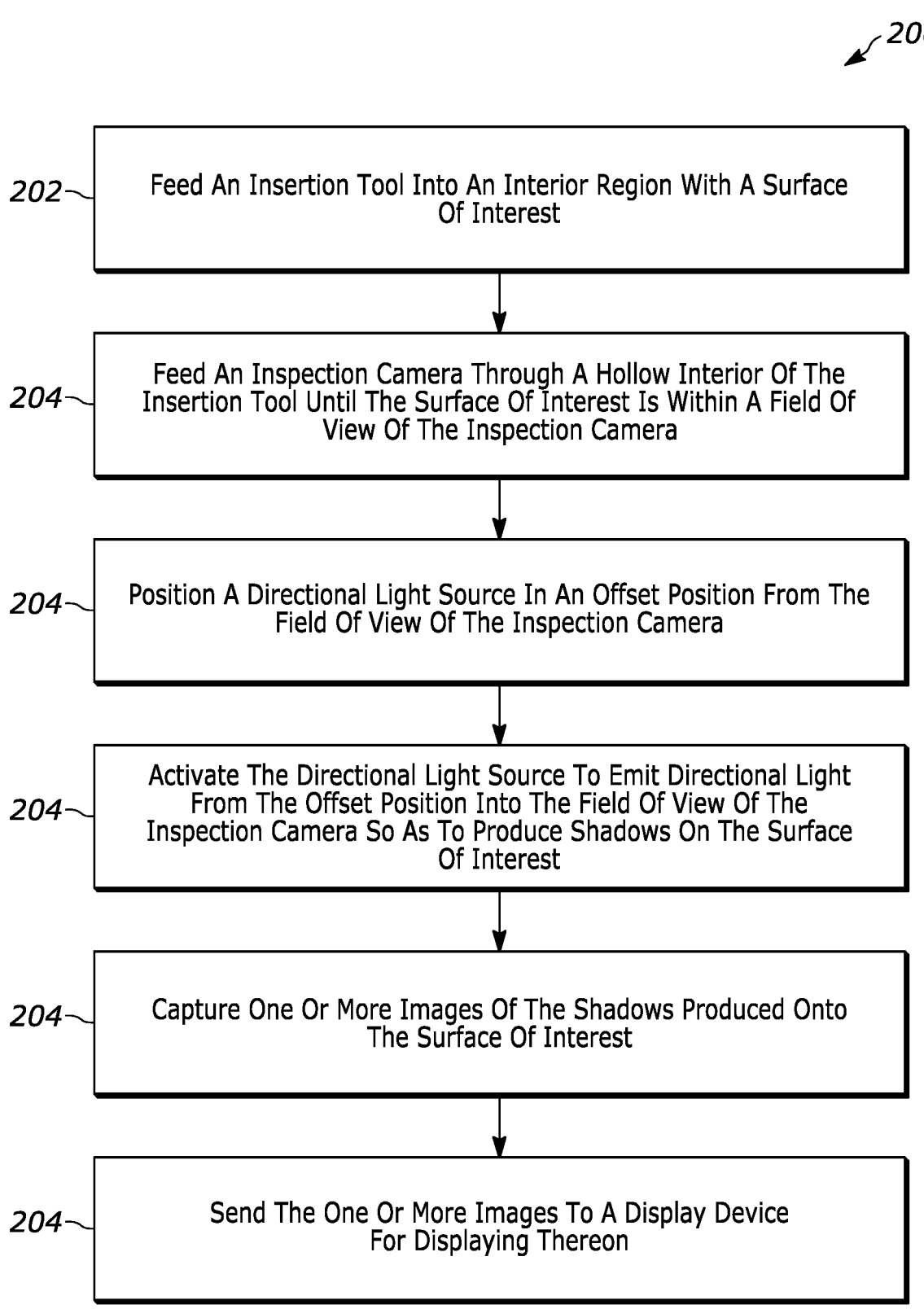
FIGS. 5A, 5B, and 5C comprise flow diagrams of methods in accordance with various embodiments of these teachings.

Turning now to FIG. 5A, a flow diagram of a method 200 for utilizing the inspection system 20 is shown. The method 200 includes feeding the insertion tool 22 into the interior region of the object 21 with the surface of interest 48, as in 202. Then, the method 200 can include feeding the inspection camera 24 through the hollow interior 28 of the insertion tool 22 until the surface of interest 48 is within the field of view 46 of the inspection camera 24, as in 204. Next, the method 200 can include positioning the directional light source 26 in the offset position, as in 206. Then, the method 200 can include activating the directional light source 26 to emit directional light from the offset position into the field of view 46 so as to cast the shadows onto the surface of interest 48. Next, the method 200 can include capturing, with the inspection camera 24, one or more images of the shadows produced on the surface of interest 48 by the directional light source 26. Finally, the method 200 can include sending the one or more images to the display device 34 for displaying thereon.

Figure 5B:
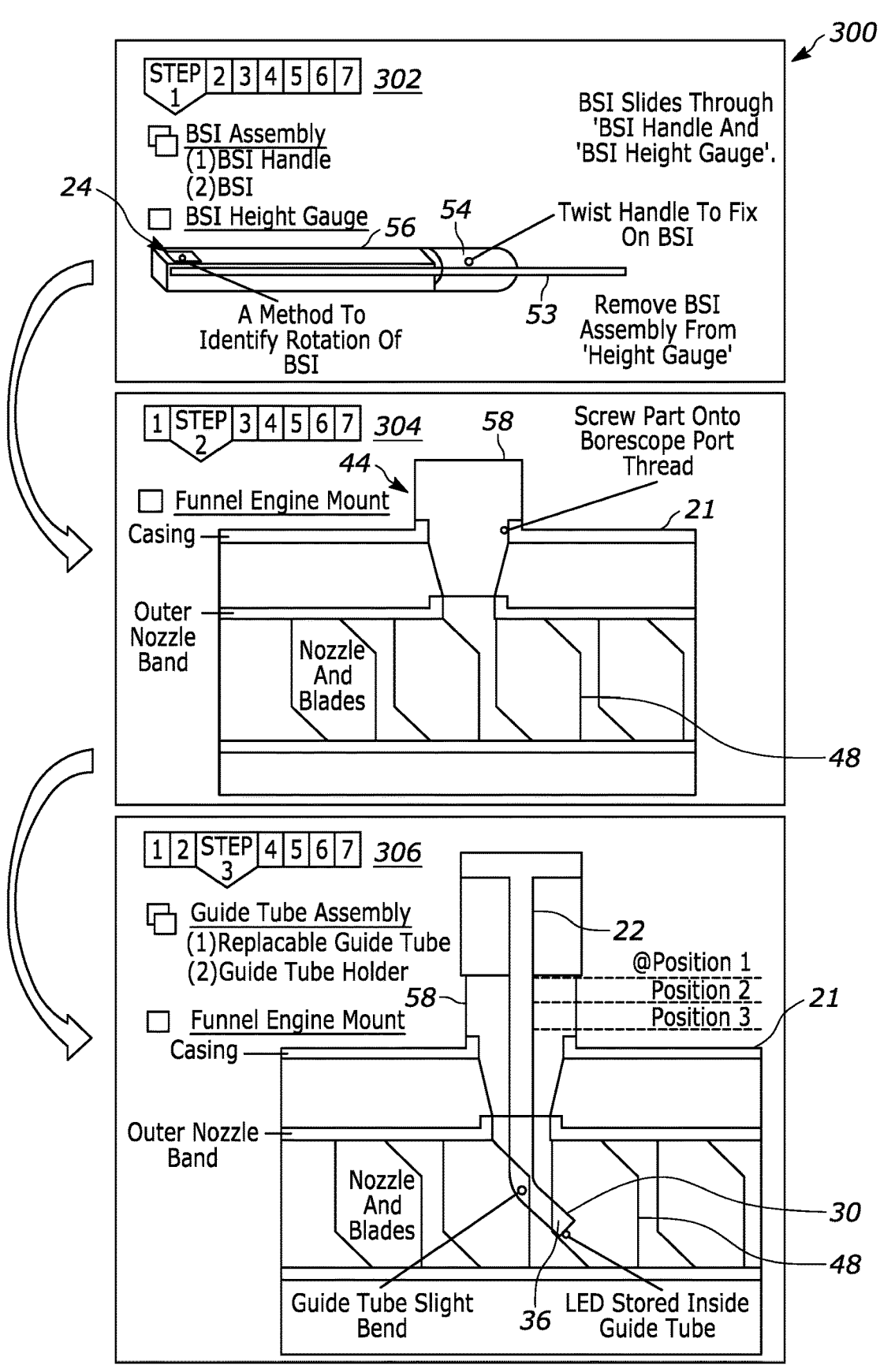
Figure 5C:
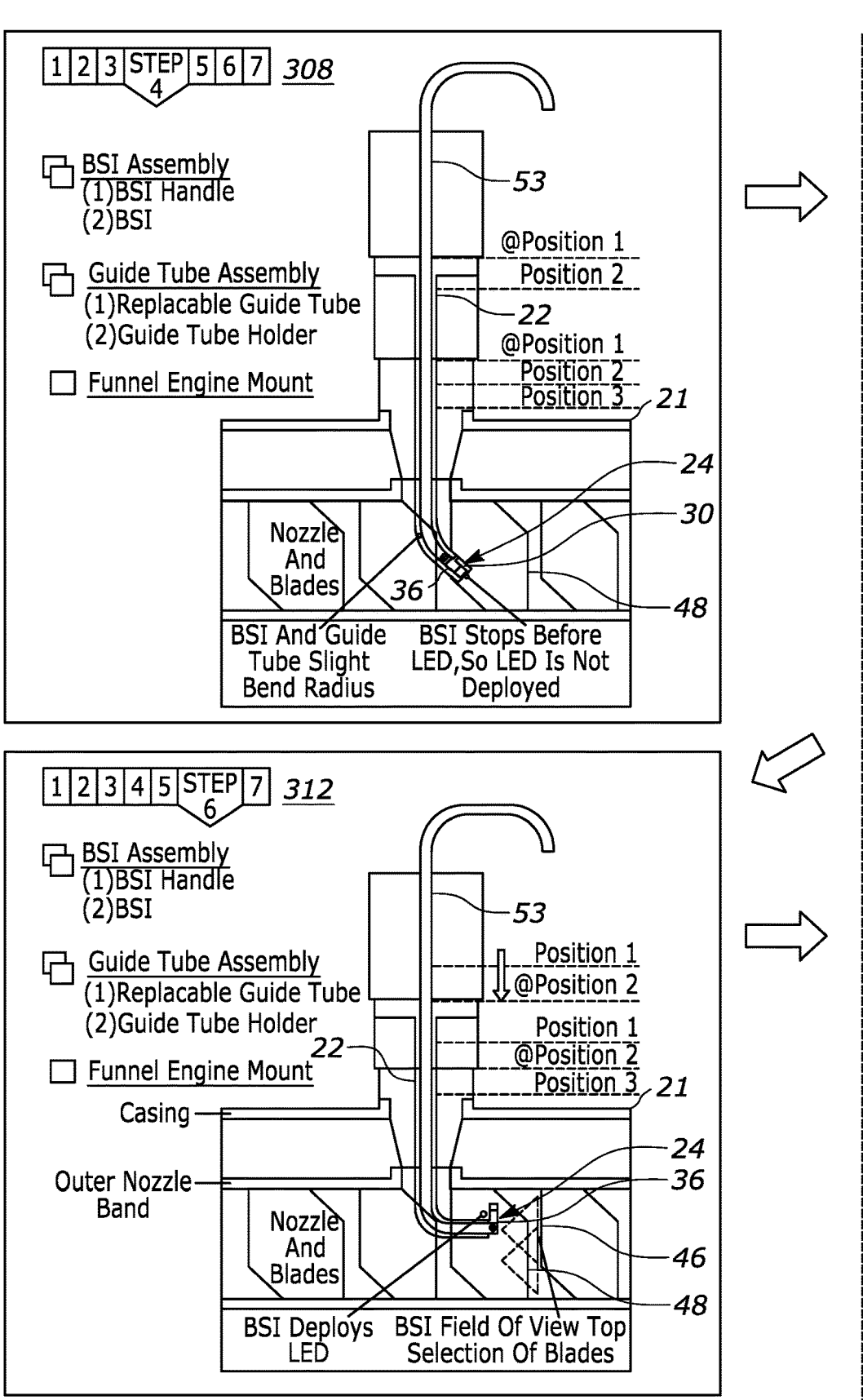

Turning now to FIGS. 5B and 5C flow diagrams of a method 300 for utilizing the inspection system 20 where the inspection camera 24 comprises a borescope inspection device (BSI) 53 having a handle 54 are shown. First, the method 300 can include utilizing a height gauge 56 to set an insertion depth for the inspection camera 24 and to identify a rotation of the inspection camera 24, as in 302. The method 300 can also include attaching a funnel mount 58 or similar insertion assistance device to the insertion port 44 of the object 21, as in 304. In some embodiments, the funnel mount 58 can be screwed into the insertion port 44 via threading.

After the funnel mount 58 is attached, the method 300 can include feeding the insertion tool 22, including the housing 30, through the funnel mount 58 and the insertion port 44 into the interior of the object 21 proximate to the surface of interest 48, as in 306. In some embodiments, a slight bend can be imparted to the insertion tool 22 so that the desired section of the surface of interest 48 can be viewed with the inspection camera 24. Then, after the insertion tool 22 is inserted, the method 300 can include feeding the BSI 53 into the hollow interior 28 of the insertion tool 22 until the distal end of the inspection camera 24 contacts but does not deploy the positionable arm 36, as in 308. Next, the insertion tool 22 with the inspection camera 24 fed therein is maneuvered into a first position for viewing the surface of interest 48, as in 310.

Once the insertion tool 22 has been maneuvered to the first position, the method 300 can include pushing the inspection camera 24 forward against the positionable arm 36 to transition the positionable arm 36 into the deployed configuration, as in 312. Once the positionable arm 36 is in the deployed configuration, the method 300 can include activating the directional light source 26 and capturing images of a first section of the surface of interest 48 such as a top section of a jet engine fan blade with the inspection camera 24 while the directional light source 26 is active. Then, the method 300 can include maneuvering the insertion tool 22, including the inspection camera 24 and the directional light source 26, into a second position and capturing images of a second section of the surface of interest 48 such as a bottom section of the jet engine fan blade with the inspection camera 24 while the directional light source 26 is active, as in 314.

Additionally, the method 200 and/or the method 300 can include moving the inspection camera 24 through the hollow interior 28 to change the angle A of the directional light L emitted from the directional light source 26 with respect to the field of view 46 of the inspection camera 24 by, for example, increasing the distance between the directional light source 26 on the positionable arm 36 and the center axis Y of the inspection camera 24. Similarly, in embodiments where the directional light source 26 is decoupled from the inspection camera 24, the method 200 and/or the method 300 can include rotating the directional light source 26 around the field of view 46 of the inspection camera 24 to alter the direction from which the directional light L is emitted from the directional light source 26 onto the surface of interest 48 with respect to the field of view 46 of the inspection camera 24.

Further, in embodiments where the inspection system 20 includes the diffuse light source 49, the method 200 and/or the method 300 can include deactivating the directional light source 26, activating the diffuse light source 49, capturing, with the inspection camera 24, additional one or more images of the surface of interest 48 as illuminated by the diffuse light source 49, and comparing the additional one or more images to the one or more images of the shadows produced on the surface of interest 48 by the directional light source 26 to identify features of interest on the surface of interest 48. in some embodiments, the comparing can include digitally overlaying the additional one or more images to the one or more images of the shadows produced on the surface of interest 48

Figure 6:
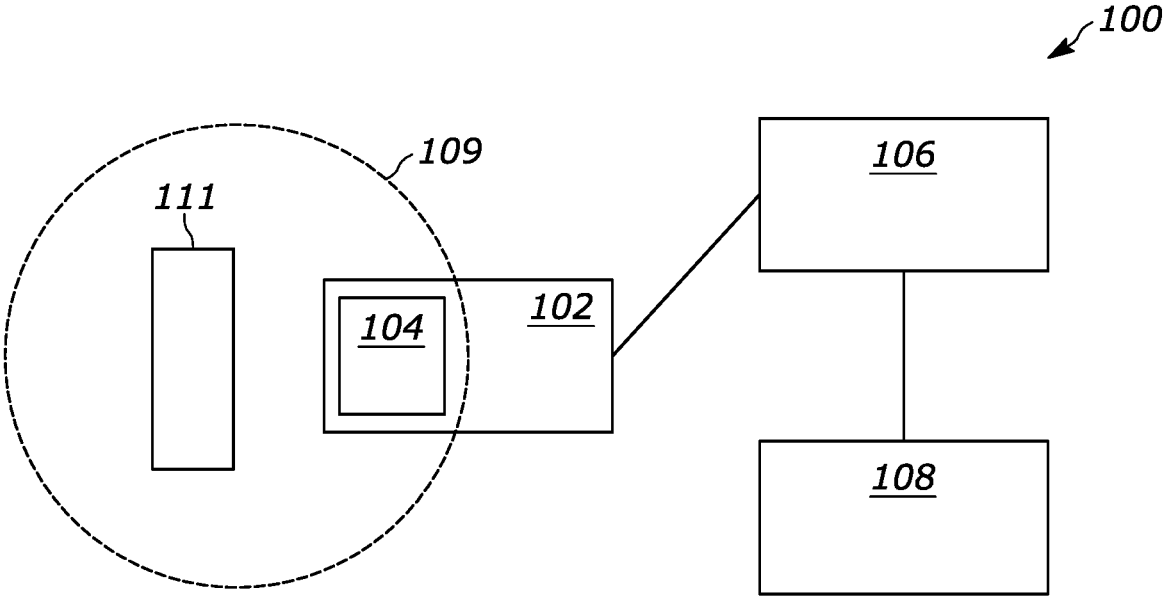
FIG. 6 comprises an inspection system for a device in accordance with various embodiments of these teachings.

While the foregoing description in connection with FIGS. 1-5C was with respect to the inspection system 20 employing only a single directional light source, the embodiments described herein are also directed to inspection systems that employ multiple directional light sources to enable additional enhancements in recognizing anomalies on a surface of interest. With reference to FIG. 6, an inspection system 100 that is compatible with many of these teachings will now be presented. The inspection system 100 can include an inspection camera 102, a lighting array 104 collocated with the inspection camera 102, a controller 106 electrically coupled to the inspection camera 102 and the lighting array 104, and a post processing system 108. In some embodiments, the inspection camera 102, including the collocated lighting array 104, can be sized and shaped to be fed into an interior of an object or device 109. However, alternative embodiments where the inspection camera 102 is configured to capture images of an exterior of the device 109 without being inserted into the interior thereof are also contemplated. In some embodiments, the inspection system 100 can include a borescope or similar small maneuverable camera that comprises the inspection camera 102. However, various other sized cameras are also contemplated. Further, the lighting array 104 can include one or more light sources configured to emit the same spectrum of light, for example, white light. As with the object 21, the device 109 can include a mechanical system, device, or object such as machine components, jet engines, or the like.

The controller 106 is configured to direct the lighting array 104 to output a sequence of different directional light and to direct the inspection camera 102 to capture a plurality of image frames while the sequence of different directional light is being output. Different directions of the sequence of different directional light are measured relative to an orientation of the inspection camera 102. Further, the post processing system 108 is configured to receive the plurality of image frames and process the plurality of image frames to identify abnormal regions of a surface of interest of the device 109 such as an interior or exterior of the device 109. In some embodiments, the controller 106 is also the post processing system 108.

In some embodiments, the lighting array 104 can be added to an existing vision system or inspection camera such as a borescope or the like without changing the footprint of such systems. Borescopes typically include an image sensor or camera (such as the inspection camera 102) placed at the end of a long flexible or rigid insertion tool such as a tube. The end of the tube is small and narrow and can be fed into difficult to reach locations such as the inside of objects or mechanical devices such as jet engines or the like. The image sensor or camera then relays image data captured thereby back to an eyepiece and/or a display where the inside of the objects or mechanical device can be viewed and magnified.

In some embodiments, the lighting array 104 with one or more illumination sources can be arranged on an insertion tool or guide tube 105 (see FIGS. 7-17) which may be used to position the image sensor or camera of the long flexible or rigid borescope insertion tool (e.g. the inspection camera 102). The guide tube 105 is used to position the inspection camera 102 at a desired location internal to the device or object being inspected. By mounting the lighting array 104 on the guide tube 105, a standard borescope may be employed as the inspection camera 102 with the added benefit of offsetting the one or more illumination sources from the image sensor or camera.

In some embodiments, the lighting array 104 can also be used in conjunction with snake-arm robots such as those disclosed in U.S. Pat. Nos. 8,069,747B2, 7,543,518B2, 11,084,169B2 and European Patents EP2170565B1, EP3643451A1, EP3643452A1, each of which is incorporated by reference in their entirety. Snake-arm robots, like borescopes, can be used for inspection of confined spaces. Snake-arm robots are electro-mechanical devices comprising an arm with high degrees of freedom that can be controlled in a snake like manner to follow a contoured path and avoid obstacles or comply when contacting obstacles. A snake arm robot typically includes a sequence of links that are driven by one or more motors and can move relative to one another to change the shape or curvature of the extension arm. In some embodiments, the inspection system 100 may include a rigid or flexible elongated extension element that is sized and shaped to insert the inspection camera 102 and the lighting array 104 into a confined space, such as the interior of a jet engine, to perform inspection. It will also be appreciated that the lighting array 104 can be deployed in conjunction with non-confined space vision systems used to identify surface anomalies on an accessible portion of an object, for example, in a photo studio setting or the like.

In some embodiments, the controller 106 is configured to synchronize changes in the sequence of directional light that is output from the lighting array 104 with a capture rate (e.g. a framerate) of the inspection camera 102 such that different frames of the plurality of image frames capture the different directions of the sequence of different directional light. For example, the controller 106 can be configured to match an on-off time of each individual light of the lighting array 104 to the time taken to capture each plurality of image frames. In some embodiments, the controller 106 can direct the inspection camera 102 to capture five frames in sequence for an active illumination period for each individual light 112 of the lighting array 104.

Like with the controller 32 discussed above, various embodiments for the controller 106 are contemplated. Such embodiments include but are not limited too simple electric or mechanical switches actuatable by an operator of the inspection system 100 to create for example a virtual flashlight. Other embodiments include microcontrollers, computer processors, and other similar devices known to those of skill in the art that are either manually operated or automatically operated in response to executing preprogramed command instructions. Further still, in some embodiments, the controller 106 can comprise separate distinct respective circuitry, components, etc. for directing the operation of the inspection camera 102 and the lighting array 104.

Illuminating the interior of the device 109 with directional light has several advantages. For example, oblique directional lighting can enhance the ability to detect minute surface variations. The reflectance of the directional light off a surface of interest 111 of the device 109 is a function of color, reflectivity, surface texture, height, gradient, and angle of the light source to a normal of the surface. Thus, illuminating the surface of interest from different directions reveals regions which are not seen through diffused lighting.

For example, shadows cast from the directional light as a result of surface height gradient vary for debris on the surface of interest vs a dent or crack formation in the surface of interest.

The use of sequenced directional light as described herein enables recognition of different surface features by comparing images taken while one of the different light sources and/or different combinations of the light sources are active. These differently illuminated images enable the inspection system 100 to exploit the effects of surface texture, height, gradient, and angle of each light source to a normal of the surface of interest at each point, as well as the distance of the inspection camera 102 to the surface of interest and the angle between the camera ray and light source ray at each pixel in the images. In some embodiments the angle and distance can be controllable to achieve different views of the surface of interest. Controlling the angle and distance can include but is not limited to changing the location of the inspection camera 102, the lighting array 104, or both relative to one another and/or relative to the surface of interest.

Figures 7, 8:
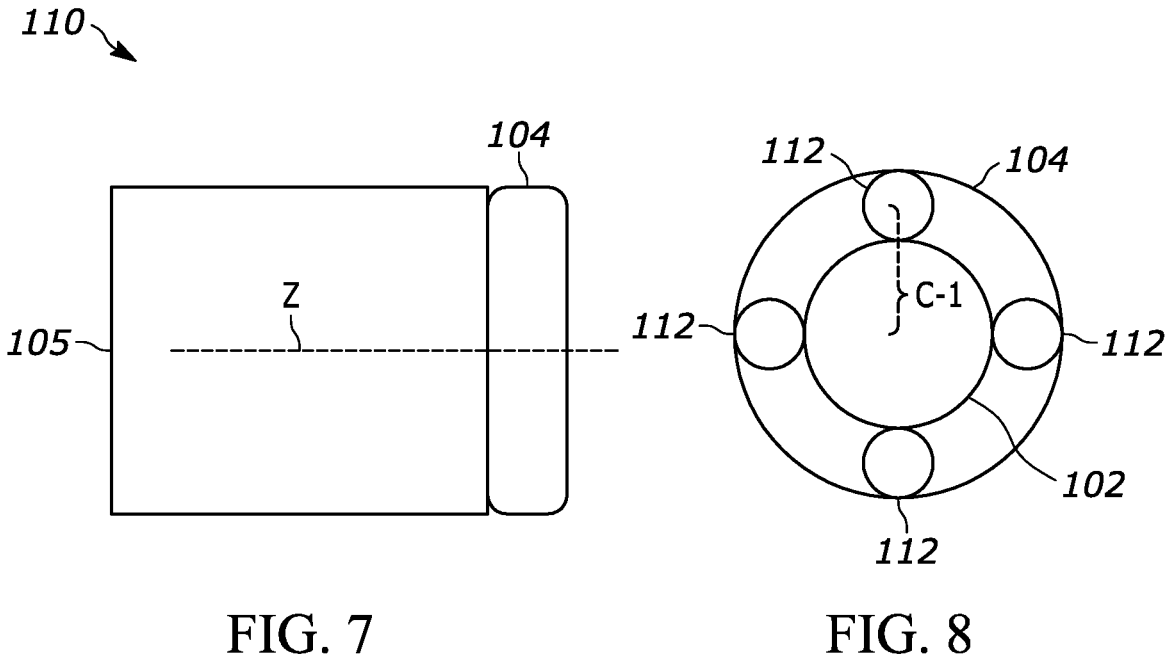
FIG. 7 comprises a partial side view of a light ring and front camera arrangement as configured in accordance with various embodiments of these teachings.
FIG. 8 comprises a front view of a light ring and front camera arrangement as configured in accordance with various embodiments of these teachings.
Figure 9:
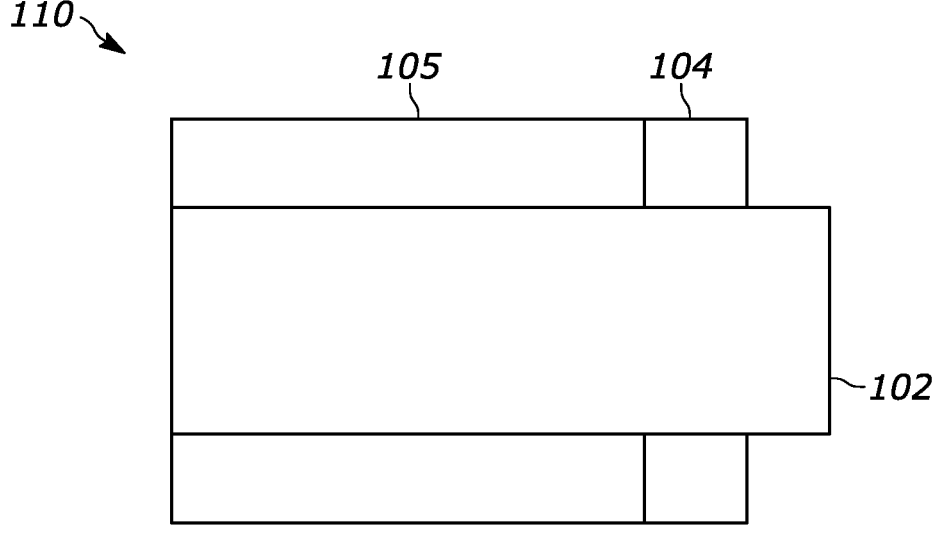
FIG. 9 is a cross-sectional view of a light ring and front camera arrangement as configured in accordance with various embodiments of these teachings.

Turning now to FIGS. 7 and 8, partial side and front views of a light ring and front camera arrangement 110 are shown respectively. The light ring and front camera arrangement 110 can include the inspection camera 102 with the lighting array 104 configured as a light ring attached to the guide tube 105 and positioned around a front face of the inspection camera 102. As seen in FIG. 8, the lighting array 104 can include a plurality of light sources 112 disposed in orthogonal directions around the lighting array 104 at a distance C-1 from a central axis Z of the inspection camera 102. In some embodiments, polar coordinates can be used to describe the position of the plurality of light sources 112 around the central axis Z. In particular, the plurality of light sources 112 can be positioned at (C-1, 0°), (C-1, 90°), (C-1,180°), and (C-1,270°). In some embodiments C-1 can be in a range of between about 3 mm and about 30 mm. Further, FIG. 9 is a partial cross-section of light ring and front camera arrangement 110. As seen in FIG. 9, the inspection camera 102 can reside inside the guide tube 105 (similar to the insertion tool 22 and the inspection camera 24 described herein). Further still, in some embodiments, the distal end of the inspection camera 102 that includes a sensor or other viewing elements of the inspection camera 102 can extend outward from the guide tube 105 past the lighting array 104.

Turning now to FIGS. 10 and 11, partial side and front views of an extendable light ring and front camera arrangement 113 are shown respectively. The extendable light ring and front camera arrangement 113 can include the inspection camera 102 with the lighting array 104 configured as an extendable light ring including light sources 112 that are positioned around the center axis Z and are selectively deployable with respect to the guide tube 105 by arms 114. The light sources 112 are deployable from a first radial or resting position concentric around the inspection camera 102 (see FIGS. 10 and 12) into a second radial or extended position (see FIGS. 11 and 13). As seen in FIG. 13, when deployed in the extended position, the lighting array 104 can include the plurality of light sources 112 disposed in orthogonal directions around, and extended out a distance from, the inspection camera 102. In terms of polar coordinates, the plurality of light sources 112 of the extendable light ring and front camera arrangement 113 can be positioned at (C-2, 0°), (C-2, 90°), (C-2, 180°), and (C-2, 270°) when in the first radial position and at (C-3, 0°), (C-3, 90°), (C-3, 180°), and (C-3, 270°) when in the first radial position. In some embodiments, C-2 can be equal to C-1 and C-3 can be greater than C-1 and C-2 in a range of between about 3 mm and about 30 mm. Offsetting the light sources 112 from the inspection camera 102 by the distance C-3 as seen in FIG. 13 can increase the angle between the direction of illumination of a point on the surface of interest 111 by at least one of the light sources 112 and the direction of imaging of the same point on the surface of interest by the inspection camera 102. The increase in angle can heighten the differences recorded into the plurality of image frames that are used by the post processing system 108 to identify the abnormal regions of the device 109.

As seen in FIGS. 10-13 the extension mechanism that comprises the arms 114 can be part of the guide tube 105. However, in an alternative arrangement the extension mechanism is part of a borescope unit that comprises the inspection camera 102. In some embodiments, the controller 106 can direct the deployment of the light sources 112 into the extended position.

Figure 14:
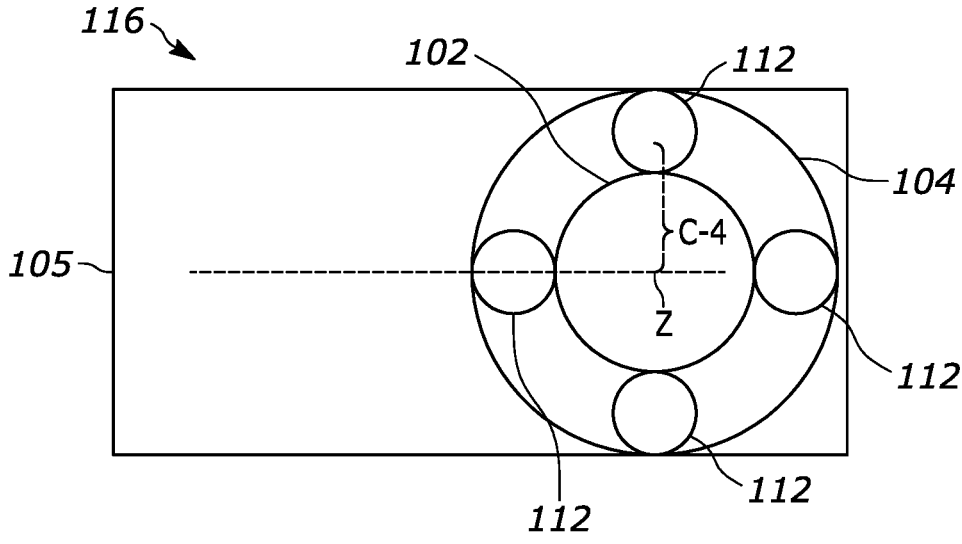
FIG. 14 comprises a partial side view of a side light ring and side camera arrangement as configured in accordance with various embodiments of these teachings.

Turning now to FIG. 14, a side light ring and side camera arrangement 116 is shown. The side light ring and side camera arrangement 116 is similar to the light ring and front camera arrangement 110 except that, for the side light ring and side camera arrangement 116, the inspection camera 102 and the lighting array 104 are disposed on a side area of a housing instead of a front area as with the light ring and front camera arrangement 110. In terms of polar coordinates, the plurality of light sources 112 of the side light ring and side camera arrangement 116 can be positioned at (C-4, 0°), (C-4, 90°), (C-4,180°), and (C-4, 270°) around the central axis Z of the inspection camera 102. In some embodiments, C-4 can be equal to C-1 and can be in a range of between about 3 mm and about 30 mm.

With respect to the operation of the light ring and front camera arrangement 110, the extendable light ring and front camera arrangement 113, and the side light ring and side camera arrangement 116, the controller 106 is configured to activate and deactivate different ones of the light sources 112 in a preconfigured sequence when directing the lighting array 104 to output the sequence of different directional light. For example, the preconfigured sequence can include activating and deactivating different ones of the light sources 112 in a progression around the inspection camera 102 from a first of the light sources 112 to a last of the light sources 112. In some embodiments, the successive activating and deactivating of the light sources 112 is such that each element of the light sources 112 is illuminated one at a time while imaging the interior of the device 109. Furthermore, the progression around the camera can include a clockwise progression, a counterclockwise progression, an alternating side progression, or various other similar progressions around the inspection camera 102. Still further, the progression may include illuminating more than one light source at a time, in different combinations.

Figure 15:
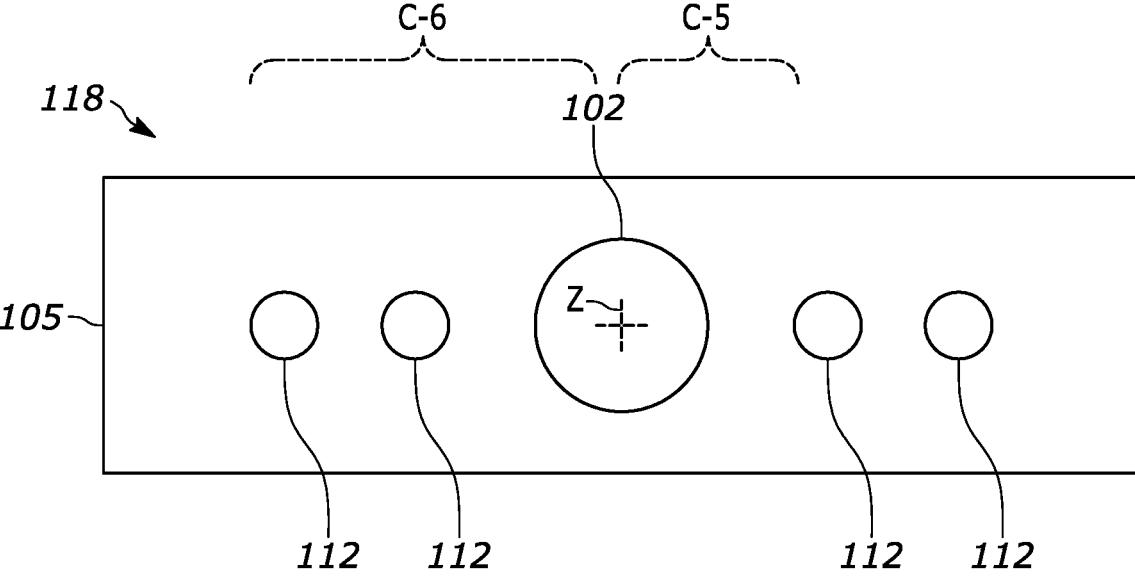
FIG. 15 comprises a partial side view of linear light and side camera arrangement as configured in accordance with various embodiments of these teachings.

Turning now to FIG. 15, a linear light and side camera arrangement 118 is shown. The linear light and side camera arrangement 118 includes the inspection camera 102 and the light sources 112 arranged in a line approximately perpendicular with respect to the central axis Z of the inspection camera 102. In terms of polar coordinates, the plurality of light sources 112 of the linear light and side camera arrangement 118 can be positioned at (C-5, 0°), (C-5,180°), (C-6, 0°), and (C-6, 180°) around the central axis Z of the inspection camera 102. In some embodiments, C-5 can is les than C-6 and both C-5 and C-6 can be in a range of between about 3 mm and about 30 mm. In operation, the preconfigured sequence order for activating and deactivating the light sources 112 can include activating and deactivating different ones of the light sources 112 in a progression from a first of the light sources 112 to a last of the light sources 112. For example, in some embodiments, the light sources 112 can be activated and deactivated in a left to right progression, a right to left progression, or the like.

This operation can enable estimation of the height of a feature on the surface of interest by comparing a distance between shadows that result when each of the light sources 112 is activated. It will be appreciated that embodiments of the inspection system 20 discussed above can also include a secondary light source for use in determining the height of a feature on the surface of interest through shadow distance comparison. Further, it will be appreciated that other progressions and combinations of the light sources 112 for the linear light and side camera arrangement 118 are also contemplated.

Figure 16:
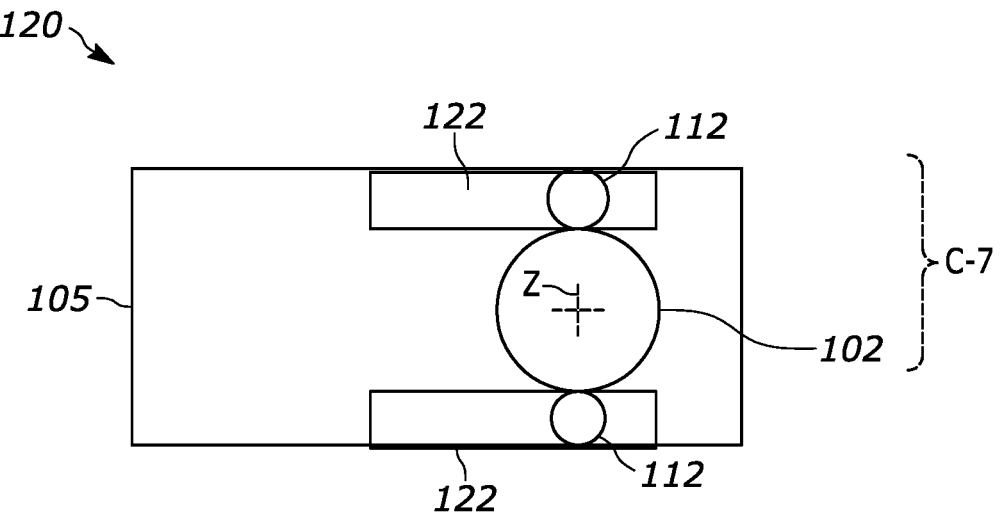
FIG. 16 comprises a partial side view of an extendable light and side camera arrangement as configured in accordance with various embodiments.
Figure 17:
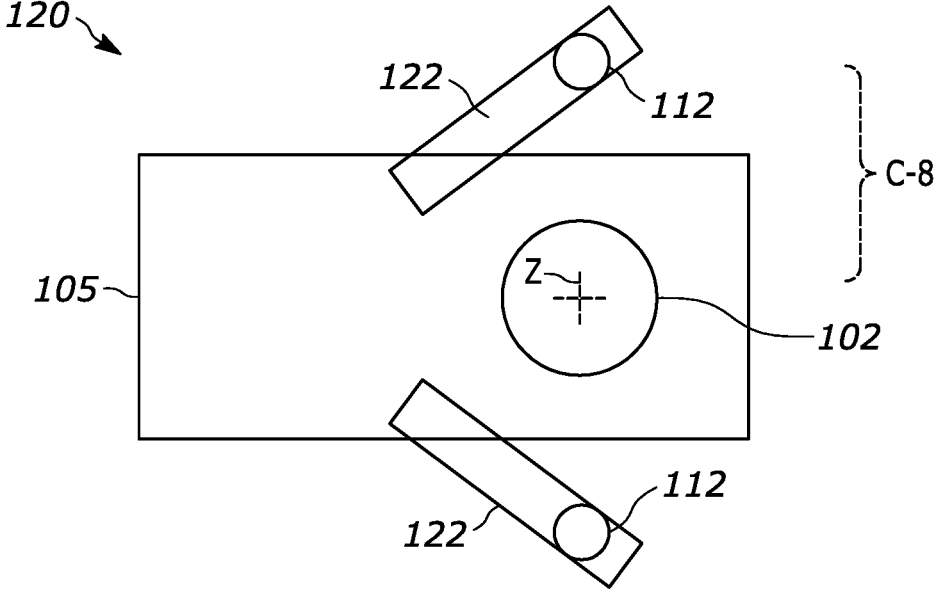
FIG. 17 comprises a partial side view of an extendable light and side camera arrangement as configured in accordance with various embodiments.

Turning now to FIGS. 16 and 17, partial side and front views of an extendable light and side camera arrangement 120 are shown respectively. The extendable light and side camera arrangement 120 can include the inspection camera 102 with the light sources 112 being selectively deployable with respect to the guide tube 105 by arms 122 similar to the arms 114 extendable light ring and front camera arrangement 113. The arms 122 are configured to deploy the light sources 112 from a resting position above and below the inspection camera 102 (see FIG. 16) into an extended position (see FIG. 17). In terms of polar coordinates relative to the central axis Z of the inspection camera 102, the plurality of light sources 112 of the extendable light and side camera arrangement 120 can be positioned at (C-7, 90°) and (C-7, 270°) when in the first resting position and at (C-8, 0°) and (C-8, 270°) when in the first radial position. In some embodiments, C-7 can be equal to C-1 and C-8 can be greater than C-1. C-8 can be in a range of between about 3 mm and about 30 mm.

As seen in FIG. 17, when deployed in the extended position, the light sources 112 are disposed at the distance C from the inspection camera 102. As with the extendable light ring and front camera arrangement 113, offsetting the light sources 112 from the inspection camera 102 by the distance can increase the angle between the direction of illumination of a point on the surface of interest 111 by at least one of the light sources 112 and the direction of imaging of the same point on the surface of interest by the inspection camera 102, which in turn can heighten the differences recorded into the plurality of image frames that are used by the post processing system 108 to identify the abnormal regions of the device 109. Further the extension mechanism that comprises the arms 122 can be part of the guide tube 105 and/or part of the borescope unit that comprises the inspection camera 102. In some embodiments, the controller 106 can direct the deployment of the light sources 112 into the extended position via the arms 122.

In some embodiments, an arrangement of the light sources 112 may be chosen which is neither linear nor circular. In particular, the arrangement of the light sources can be chosen in order to match the direction of illumination of the light sources 112 to an orientation of the internal area of the device 109 being imaged, and to optimize the detection of features on the surface of interest of the device 109.

In some embodiments, the light sources 112 can include light emitting diodes (LEDs). Additional and alternative light sources such as lasers, fiberoptic light pipes, incandescent, etc. are also contemplated. It will also be appreciated that additional configurations for the lighting array 104 with more or fewer light sources than shown in FIGS. 7-17 are contemplated. For example, in some embodiments, the lighting array 104 can include one or more lighting elements configured to physically rotate around the inspection camera 102 such as around a center axis of the lighting array 104.

Additionally, in some embodiments, the lighting array 104 can include one or more lighting elements configured to physically vary in radius with respect to a central axis of the lighting array 104. These and other embodiments can in general produce infinite positions within an annulus of the inspection system 100 at which a light of the lighting array 104 could be positioned, which would allow the operator to have a quasi-3D view of the surface of interest. It will also be appreciated that different combinations and sequences for illuminating each of the light sources 112 are contemplated. For example, in some embodiments, the different directional light can be produced by different groups of multiple light sources being sequentially activated and deactivated in one or more of the various progressions described herein.

Figure 18:
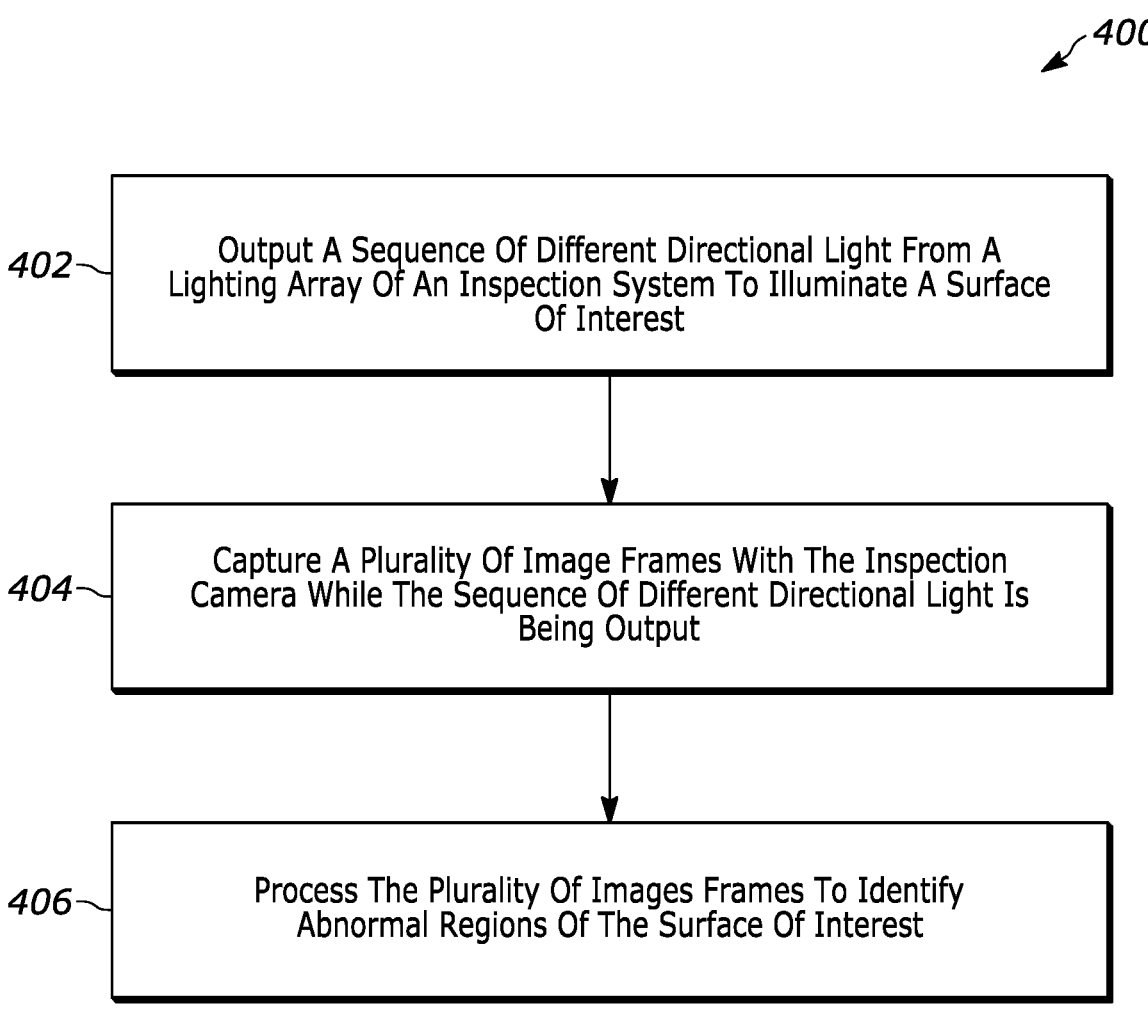
FIG. 18 comprises a flow diagram of a method in accordance with various embodiments of these teachings.

Turning now to FIG. 18, a flow diagram for a method 400 of operating the inspection system 100 is shown. The method 400 can include outputting the sequence of different directional light from the lighting array 104 to illuminate the surface of interest of the device 109, as in 402. Then, the method 400 can include capturing a plurality of image frames with the inspection camera 102 while the sequence of different directional light is being output, as in 404. Finally, the method 400 can include processing the plurality of image frames with the post processing system 108 to identify abnormal regions of the surface of interest, as in 406.

In some embodiments, processing the plurality of image frames to identify the abnormal regions includes processing the ones of plurality of image frames that include different directional light geometries to highlight or emphasize any anomalies in the surface of interest by subtracting directional lighting data for a given direction from a mean calculated from all images. This process can include averaging together the plurality of image frames to generate a diffuse light image, and then generating difference images by comparing each frame of the plurality of image frames with the diffuse light image.

Further, in some embodiments, the plurality of image frames includes light reflection data corresponding to the sequence of different directional light that is output from the lighting array 104. Further still, processing the plurality of image frames with the post processing system 108 to identify the abnormal regions can include normalizing the light reflection data using computer modeled simulations, such as computer aided drafting (CAD) models or the like, of the surface of interest as exposed to simulated directional light. In some embodiments, the post processing system 108 can utilize the computer modeled simulations to generate difference images as compared with diffused light for use in feature enhancement and detection.

The post processing system 108 can extract features of interest from the difference images using various image processing techniques. These image processing techniques can include, but are not limited to edge detection processes, feature extraction processes, image Segmentation, and other similar techniques known in the art. Further these image processing techniques can be utilized in conjunction with machine learning, support-vector machines (SVMs), and/or other artificial intelligence processes and techniques in order to automate the detection of the features of interest within the difference images.

In some embodiments, the inspection system 100 may be used particularly to identify shadows and the differences in shadows cast by features of the device 109 onto surfaces thereof by the light sources 112. In cases where multiple ones of the light sources 112 are simultaneously illuminated the shadows may be partial shadows or penumbras. Differentiating between the direction of the shadow and degree of shadowing across multiple images captured by the inspection camera 102 may provide a more distinct differentiation than referencing differences in illumination direction of the same illuminated surface.

In some embodiments, differences in the images containing the shadows caused by features which are not present in the CAD model, such as defects including cracks or the edges of spalled coatings, may be particularly emphasized when comparing images illuminated in different directions since some images may contain a shadow and others may contain no shadow in any location. The differences in the images may be further exaggerated by normalizing the light intensity of each point (e.g. each pixel) in each of the images of the surfaces which are present in the representative CAD model of the device 109. This normalization enables the surfaces expected to be present and captured in each image to be represented as flat uniform images (e.g. a uniform grayscale image). In this case, shadows may be the only significant features present in the images.

Further, in cases where the object being inspected is known in advance, the normalizing may be achieved by a process of simulating the surface, the lighting and the imaging systems in a CAD model simulation to generate a sample image or images representative of how the object would look under normal illumination. For each pixel in the sample image or images, a factor is determined by which the light intensity of each pixel in the image can be scaled to produces the same value (e.g. to produce a flat image having a uniform intensity of light). These factors may be stored in an array, a representation of an array such as an image, or other suitable machine readable memory systems. Then, the saved factors, which were determined for each pixel in the sample image or image, can be applied, by for example the post processing system 108, to each pixel in the real image or images captured by the inspection camera 102. As such, the effects of color, reflectivity, surface texture, height, gradient, and angle of the light sources 112 to a normal of the surface of interest, and the effects of angle and distance to the inspection camera 102, may be neutralized, so that only anomalies, i.e. discrepancies between the surface represented in the CAD model and the actual surface, are emphasized in the resulting images or array of values output from the post processing system 108. The resulting computed image or array of values may be used to guide an observer or an artificial intelligence engine in subsequent inspection of the anomalies so as to improve detection of defects.

In some embodiments, the inspection system 100 and the method 200 can be used in conjunction with other inspection tools and processes to identify a location in the device 109 to be inspected. For example, visual inspection of artificial intelligence system processing of a feed from the inspection camera 102 can be used to identify a section of the device 109 that is showing signs of stress sufficient to warrant further inspection. Then, that identified section can be subject to the sequence of different directional light and post processing as described herein to produce enhanced insights on the level of distress of the identified section.

Further aspects of the disclosure are provided by the subject matter of the following clauses:

An inspection system, comprising: an inspection camera; and at least one directional light source positioned in an offset position from a central axis of the inspection camera, wherein the at least one directional light source is configured to emit directional light from the offset position into the field of view of the inspection camera so as to produce shadows on a surface of interest.

The inspection system of any preceding clause, wherein a distance between a center of the inspection camera and the offset positions is in a range of between about 3 mm and about 30 mm.

The inspection system of any preceding clause, further comprising a housing that supports and orients the at least one directional light source in the offset position, the housing including a passage that receives and supports the inspection camera.

The inspection system of any preceding clause, wherein the housing includes a positionable arm that supports the at least one directional light source, the positionable arm having a stowed configuration and a deployed configuration, wherein each directional light source is located in the offset position when the positionable arm is in the deployed configuration.

The inspection system of any preceding clause, wherein feeding the inspection camera into the passage moves the positionable arm into the deployed configuration.

The inspection system of any preceding clause, wherein the positionable arm translates relative to the housing to move between the stowed configuration and the deployed configuration.

The inspection system of any preceding clause, wherein the positionable arm pivots relative to the housing to move between the stowed configuration and the deployed configuration.

The inspection system of any preceding clause, further comprising an actuator configured to move the positionable arm between the stowed configuration and the deployed configuration.

The inspection system of any preceding clause, further comprising a biasing component configured to bias the positionable arm toward the deployed configuration.

The inspection system of any preceding clause, further comprising a biasing component configured to bias the positionable arm toward the stowed configuration.

The inspection system of any preceding clause, further comprising an insertion tool coupled to the housing and having a hollow interior open to the passage, wherein the insertion tool is configured to receive the inspection camera within the hollow interior and feed the inspection camera into the passage.

The inspection system of any preceding clause, further comprising a diffuse light source integrated with the inspection camera.

The inspection system of any preceding clause, further comprising a display device coupled to the inspection camera, wherein the inspection camera is configured to capture one or more images of the shadows produced on the surface of interest, and wherein the display device is configured to receive and display the one or more images.

A method, comprising: feeding an insertion tool into an interior region with a surface of interest; feeding an inspection camera through a hollow interior of the insertion tool; positioning at least one directional light source in an offset position from the inspection camera; activating the at least one directional light source to emit directional light from the offset position into a field of view of the inspection camera so as to produce shadows on the surface of interest; and capturing, with the inspection camera, one or more images of the shadows produced on the surface of interest.

The method of any preceding clause, further comprising: feeding the inspection camera through the hollow interior of the insertion tool into a passage of a housing coupled to the insertion tool; and moving a positionable arm of the housing from a stowed configuration into a deployed configuration to position the directional light source in the offset position.

The method of any preceding clause, further comprising contacting a tab portion of the positionable arm with the inspection camera as the inspection camera is fed into the passage to move the positionable arm into the deployed configuration.

The method of any preceding clause, further comprising activating an actuator to move the positionable arm into the deployed configuration.

The method of any preceding clause, further comprising moving the inspection camera through the hollow interior of the insertion tool to change an angle of the directional light emitted from the at least one directional light source with respect to the field of view of the inspection camera.

The method of any preceding clause, further comprising rotating the at least one directional light source around the field of view of the inspection camera to alter an angle of the directional light emitted from the directional light source with respect to the field of view of the inspection camera.

The method of any preceding clause, further comprising: deactivating the at least one directional light source and activating a diffuse light source integrated with the inspection camera; capturing, with the inspection camera, additional one or more images of the surface of interest as illuminated by the diffuse light source; and comparing the additional one or more images to the one or more images of the shadows produced on the surface of interest to identify features of interest on the surface of interest.

The method of any preceding clause, further comprising feeding an inspection camera through a hollow interior of the insertion tool until the surface of interest is within a field of view of the inspection camera.

The method of any preceding clause, further comprising sending the one or more images to a display device for displaying thereon.

A method for identifying anomalies, the method comprising outputting a sequence of different directional light from a lighting array of an inspection system to illuminate a surface of interest, wherein the lighting array is collocated with an inspection camera of the inspection system, and wherein different directions of the sequence of different directional light are measured relative to an orientation of the inspection camera; capturing a plurality of image frames with the inspection camera while the sequence of different directional light is being output; and processing the plurality of image frames to identify an abnormal region of the surface of interest.

The method of any preceding clause, wherein processing the plurality of image frames to identify the abnormal region includes averaging together the plurality of image frames to generate a diffuse light image; and generating difference images by comparing each frame of the plurality of image frames with at least one of the diffuse light image or another frame of the plurality of image frames.

The method of any preceding clause, wherein the plurality of image frames include light reflection data corresponding to the sequence of different directional light that is output from the lighting array, and wherein processing the plurality of image frames to identify the abnormal region includes normalizing the light reflection data using computer modeled simulations of the surface of interest as exposed to simulated directional light.

The method of any preceding clause further comprising synchronizing changes in the sequence of different directional light as output from the lighting array with a capture rate for the plurality of image frames such that different frames of the plurality of image frames capture the different directions of the sequence of directional light.

The method of any preceding clause wherein outputting the sequence of different directional light includes activating and deactivating different light sources of the lighting array in a preconfigured sequence order, the different light sources being positioned at different locations with respect to the inspection camera.

The method of any preceding clause wherein the different light sources are located concentrically around the inspection camera, and wherein the preconfigured sequence order includes activating and deactivating different ones of the different light sources in a progression around the inspection camera from a first of the different light sources to a last of the different light sources.

The method of any preceding clause wherein the different light sources are located in line with the inspection camera, and wherein the preconfigured sequence order includes activating and deactivating different ones of the different light sources in a progression from a first of the different light sources to a last of the different light sources.

An inspection system comprising an inspection camera; a lighting array collocated with the inspection camera, wherein the lighting array is configured to output a sequence of different directional light, and wherein different directions of the sequence of different directional light are measured relative to an orientation of the inspection camera; and a controller electrically coupled to the inspection camera and the lighting array, wherein the controller is configured to direct the lighting array to output the sequence of different directional light to illuminate a surface of interest and to direct the inspection camera to capture a plurality of image frames while the sequence of different directional light is being output.

The inspection system of any preceding clause further comprising a post processing system configured to receive the plurality of image frames and process the plurality of image frames to identify an abnormal region of the surface of interest.

The inspection system of any preceding clause wherein the controller is the post processing system.

The inspection system of any preceding clause, wherein the post processing system being configured to process the plurality of image frames to identify the abnormal region includes the post processing system being configured to average together the plurality of image frames to generate a diffuse light image; and generate difference images by comparing each frame of the plurality of image frames with the diffuse light image.

The inspection system of any preceding clause, wherein the plurality of image frames include light reflection data corresponding to the sequence of different directional light that is output from the lighting array, and wherein the post processing system being configured to process the plurality of image frames to identify the abnormal region includes the post processing system being configured to normalizing the light reflection data using computer modeled simulations of the surface of interest as exposed to simulated directional light.

The inspection system of any preceding clause wherein the controller is further configured to synchronize changes in the sequence of different directional light that is output from the lighting array with a capture rate of the inspection camera such that different frames of the plurality of image frames capture the different directions of the sequence of directional light.

The inspection system of any preceding clause wherein the lighting array includes a plurality of light sources positioned at different locations with respect to the inspection camera, and wherein the controller is further configured to activate and deactivate different ones of the plurality of light sources in a preconfigured sequence order when directing the lighting array to output the sequence of different directional light.

The inspection system of any preceding clause wherein the plurality of light sources include a plurality of LEDs located concentrically around the inspection camera.

The inspection system of any preceding clause wherein the preconfigured sequence order includes the controller activating and deactivating different LEDs of the plurality of LEDs in a progression around the inspection camera from a first of the plurality of LEDs to a last of the plurality of LEDs.

The inspection system of any preceding clause wherein the plurality of light sources includes a plurality of LEDs that are selectively deployable from a resting position concentric around the inspection camera into an extended position.

The inspection system of any preceding clause wherein the preconfigured sequence order includes the controller deploying the plurality of LEDs into the extended position and activating and deactivating different ones of the plurality of LEDs in a progression around the inspection camera from a first of the plurality of LEDs to a last of the plurality of LEDs.

The inspection system of any preceding clause wherein the plurality of light sources are located in line with the inspection camera, and wherein the preconfigured sequence order includes activating and deactivating different ones of the plurality of light sources in a progression from a first of the plurality of light sources to a last of the plurality of light sources.

The inspection system of any preceding clause wherein the inspection camera comprises a borescope.

The inspection system of any preceding clause wherein the positionable arm includes a flexible member configured to be elastically or plastically deformed relative to the housing to move between the stowed configuration and the open configuration when a force is applied to a part thereof.

What is claimed is:

1. An inspection system, comprising:

an inspection camera to capture one or more images of shadows on a surface of interest;

at least one directional light source positioned in an offset position from a central axis of the inspection camera, wherein the at least one directional light source is configured to emit directional light from the offset position into the field of view of the inspection camera so as to produce shadows on the surface of interest;

a housing that supports and orients the at least one directional light source in the offset position, the housing including a passage that receives and supports the inspection camera; and a guide tube coupled to the housing, having a proximal end, a distal end, and a hollow interior open to the passage, wherein the guide tube is configured for receiving the inspection camera within the hollow interior at the proximal end and feeding the inspection camera to the distal end and into the passage of the housing, wherein the guide tube and the housing are coupled together such that the guide tube, the housing, and the at least one directional light source are feedable together into a confined space to perform an inspection therein, wherein the inspection camera is feedable through the guide tube between a first position inside the guide tube and a second position extending out past a terminal end of the housing to change an angle of the directional light emitted from the at least one directional light source with respect to the field of view of the inspection camera.

2. The inspection system of claim 1, wherein a distance between a center of the inspection camera and the offset position is in a range of between about 3 mm and about 30 mm.

3. The inspection system of claim 1, wherein the housing includes a positionable arm that supports the at least one directional light source, the positionable arm having a stowed configuration and a deployed configuration, wherein the at least one directional light source is located in the offset position when the positionable arm is in the deployed configuration.

4. The inspection system of claim 3, wherein feeding the inspection camera into the passage moves the positionable arm into the deployed configuration.

5. The inspection system of claim 3, wherein the positionable arm translates relative to the housing to move between the stowed configuration and the deployed configuration.

6. The inspection system of claim 3, wherein the positionable arm pivots relative to the housing to move between the stowed configuration and the deployed configuration.

7. The inspection system of claim 3, further comprising an actuator configured to move the positionable arm between the stowed configuration and the deployed configuration.

8. The inspection system of claim 3, further comprising a biasing component configured to bias the positionable arm toward the deployed configuration.

9. The inspection system of claim 3, further comprising a biasing component configured to bias the positionable arm toward the stowed configuration.

10. The inspection system of claim 1, further comprising a diffuse light source integrated with the inspection camera.

11. The inspection system of claim 1, further comprising a display device coupled to the inspection camera,
wherein the display device is configured to receive and display the one or more images.

12. A method, comprising:
feeding an insertion tool into an interior region with a surface of interest, the insertion tool having a guide tube with a proximal end and a distal end and a housing coupled to the distal end;
feeding an inspection camera through a hollow interior of the guide tube from the proximal end to the distal end and into a passage of the housing, the housing receiving and supporting the inspection camera;

positioning a plurality of directional light sources in different offset positions from the inspection camera, wherein the housing supports and orients the plurality of directional light sources in the different offset positions;
activating the plurality of directional light sources to emit directional light sequentially from each of the plurality of directional light sources from the offset positions into a field of view of the inspection camera so as to produce shadows on the surface of interest;
capturing, with the inspection camera, a plurality of image frames while the sequence of directional light is being emitted; and
identifying an abnormal region of the surface of interest by:
averaging together the plurality of image frames to generate a diffuse light image; and
generating difference images by comparing each frame of the plurality of image frames with at least one of the diffuse light image or another frame of the plurality of image frames.

13. The method of claim 12, further comprising:
moving a positionable arm of the housing from a stowed configuration into a deployed configuration to position the plurality of directional light sources in the offset positions.

14. The method of claim 13, further comprising contacting a tab portion of the positionable arm with the inspection camera as the inspection camera is fed into the passage to move the positionable arm into the deployed configuration.

15. The method of claim 13, further comprising activating an actuator to move the positionable arm into the deployed configuration.

16. The method of claim 12, further comprising moving the inspection camera through the hollow interior of the insertion tool to change an angle of the directional light emitted from the plurality of directional light sources with respect to the field of view of the inspection camera.

17. The method of claim 12, further comprising rotating the plurality of directional light sources around the field of view of the inspection camera to alter an angle of the directional light emitted from the directional light sources with respect to the field of view of the inspection camera.

18. The method of claim 12, further comprising:
deactivating the plurality of directional light sources and activating a diffuse light source integrated with the inspection camera;
capturing, with the inspection camera, additional one or more images of the surface of interest as illuminated by the diffuse light source; and
comparing the additional one or more images to one or more images of the shadows produced on the surface of interest captured while the sequence of directional light is being emitted to identify features of interest on the surface of interest.

* * * * *